United States Patent
Kasai et al.

(10) Patent No.: US 11,939,013 B2
(45) Date of Patent: Mar. 26, 2024

(54) STEERING CONTROL DEVICE

(71) Applicant: Hitachi Astemo, Ltd., Hitachinaka (JP)

(72) Inventors: Shinya Kasai, Tokyo (JP); Kotaro Shiino, Hitachinaka (JP); Junya Takahashi, Tokyo (JP); Masaru Yamasaki, Tokyo (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 164 days.

(21) Appl. No.: 17/425,379

(22) PCT Filed: Aug. 19, 2019

(86) PCT No.: PCT/JP2019/032228
§ 371 (c)(1),
(2) Date: Jul. 23, 2021

(87) PCT Pub. No.: WO2020/166113
PCT Pub. Date: Aug. 20, 2020

(65) Prior Publication Data
US 2022/0097758 A1    Mar. 31, 2022

(30) Foreign Application Priority Data
Feb. 14, 2019  (JP) ................. 2019-024361

(51) Int. Cl.
*B62D 6/00*   (2006.01)
(52) U.S. Cl.
CPC ............. *B62D 6/002* (2013.01); *B62D 6/008* (2013.01); *B60W 2540/18* (2013.01)
(58) Field of Classification Search
CPC .................................................... B62D 6/002
See application file for complete search history.

(56) References Cited

U.S. PATENT DOCUMENTS

| 2004/0040781 A1 | 3/2004 | Fujioka et al. |
| 2006/0047391 A1* | 3/2006 | Katou ............ B62D 6/008 180/443 |

(Continued)

FOREIGN PATENT DOCUMENTS

| JP | 2004-082862 A | 3/2004 |
| JP | 2006-015811 A | 1/2006 |

(Continued)

OTHER PUBLICATIONS

Office Action issued in corresponding Chinese Application No. 201980084382.1, dated Nov. 22, 2022 with Machine translation (14 pages).

(Continued)

*Primary Examiner* — Ryan Rink
(74) *Attorney, Agent, or Firm* — Foley & Lardner LLP

(57) ABSTRACT

An object of the present invention is to provide a steering control device capable of reducing a steering amount while securing operability of a driver according to a traveling condition. A steering control device 61 forming a steer-by-wire system, which has no physical connection between a steering shaft by a driver and an actual steered angle of a vehicle wheel, the steering control device including an actual steered angle calculation unit 74 that determines the actual steered angle based on a steering angle and a steering torque generated on the steering shaft. The actual steered angle calculation unit 74 controls the actual steered angle based on the steering torque in a region where the steering angle is equal to or smaller than a predetermined value, and controls the actual steered angle based on a parameter different from the steering torque when the steering angle is larger than the predetermined value or a changed steering torque gain from when the steering angle is smaller than the predetermined value.

17 Claims, 25 Drawing Sheets

(56) References Cited

U.S. PATENT DOCUMENTS

| | | | | |
|---|---|---|---|---|
| 2008/0021612 A1* | 1/2008 | Sakuma | ................ | B62D 5/008 |
| | | | | 701/41 |
| 2009/0069979 A1* | 3/2009 | Yamashita | ........... | B62D 5/0463 |
| | | | | 701/42 |
| 2012/0125141 A1* | 5/2012 | Rosenmaier | ........... | B62D 5/006 |
| | | | | 74/499 |
| 2018/0079447 A1* | 3/2018 | Yamashita | ........... | B62D 5/0469 |
| 2019/0233000 A1* | 8/2019 | Matsuda | ................ | B62D 5/006 |
| 2019/0233001 A1* | 8/2019 | Namikawa | ............. | B62D 5/001 |
| 2020/0377149 A1* | 12/2020 | Tagami | ................ | B62D 5/0463 |

FOREIGN PATENT DOCUMENTS

| | | | |
|---|---|---|---|
| JP | 2006-248308 A | 9/2006 | |
| JP | 2008-087680 A | 4/2008 | |
| JP | 2010-280312 A | 12/2010 | |
| JP | 2011-001041 A | 1/2011 | |

OTHER PUBLICATIONS

International Search Report with English translation and Written Opinion issued in corresponding application No. PCT/JP2019/032228 dated Oct. 8, 2019.

\* cited by examiner

STEERING CONTROL DEVICE

TECHNICAL FIELD

The present invention relates to a steering control device forming a steer-by-wire having no physical connection between a steering shaft and an actual steered angle of a vehicle wheel.

BACKGROUND ART

As a technique for realizing steering control of a vehicle, a steer-by-wire system, which can independently control a steering shaft connected to a steering wheel and a mechanism that generates an actual steered angle on a wheel of the vehicle by coupling both via electrical signal without physical coupling, has been proposed.

Regarding such a steer-by-wire, for example, a technique described in PTL 1 is known. PTL 1 proposes a technique for calculating an actual steered angle based on a steering angle detected by a steering angle detection unit and an angle gain. In addition, in PTL 1, when an obstacle is detected in front of a host vehicle by a monitoring sensor, such as a stereo camera, a laser radar, and an infrared radar, and it is determined that emergency avoidance is necessary, a wheel angle control unit sets a value of an angle gain all to be larger than a standard value. For example, in a case of a vehicle in which the standard value of the angle gain all is $1/15$, the angle gain all is set to $1/10$ when the obstacle is detected. As a result, it is described that, when the obstacle is detected, the vehicle is easily bent by about 1.5 times as much as that at the time of normal traveling so that controllability (avoidability of the obstacle) is improved.

CITATION LIST

Patent Literature

PTL 1: JP 2004-82862 A

SUMMARY OF INVENTION

Technical Problem

However, in a configuration disclosed in PTL 1, the detected steering angle and the actual steered angle are in a proportional relationship, and the obstacle can be avoided by changing such a proportional angle gain, but securing of operability of a driver during normal traveling is not considered. That is, in the configuration disclosed in PTL 1, a steering feeling of the driver is suddenly changed with respect to the previous steering feeling because the above-described angle gain α 11 is changed. In some cases, the actual steered angle exceeds the driver's expectation, so that it is difficult to achieve the improvement of operability.

Therefore, the present invention provides a steering control device capable of reducing a steering amount while securing operability of a driver according to a traveling condition.

Solution to Problem

In order to solve the above problems, a steering control device according to the present invention is a steering control device forming a steer-by-wire system, which has no physical connection between a steering shaft by a driver and an actual steered angle of a vehicle wheel, and includes a calculation unit that determines the actual steered angle based on a steering angle and a steering torque generated on the steering shaft. The calculation unit controls the actual steered angle based on the steering torque in a region where the steering angle is equal to or smaller than a predetermined value, and controls the actual steered angle based on a parameter different from the steering torque when the steering angle is larger than the predetermined value or a changed steering torque gain from when the steering angle is smaller than the predetermined value.

Advantageous Effects of Invention

According to the present invention, it is possible to provide the steering control device capable of reducing the steering amount while securing the operability of the driver according to the traveling condition.

Other objects, configurations, and effects which have not been described above become apparent from an embodiment to be described hereinafter.

DESCRIPTION OF EMBODIMENTS

Next, an embodiment of the present invention will be described. Note that the present invention is not limited to the following embodiment, and can be implemented in various embodiments.

Figure 1:
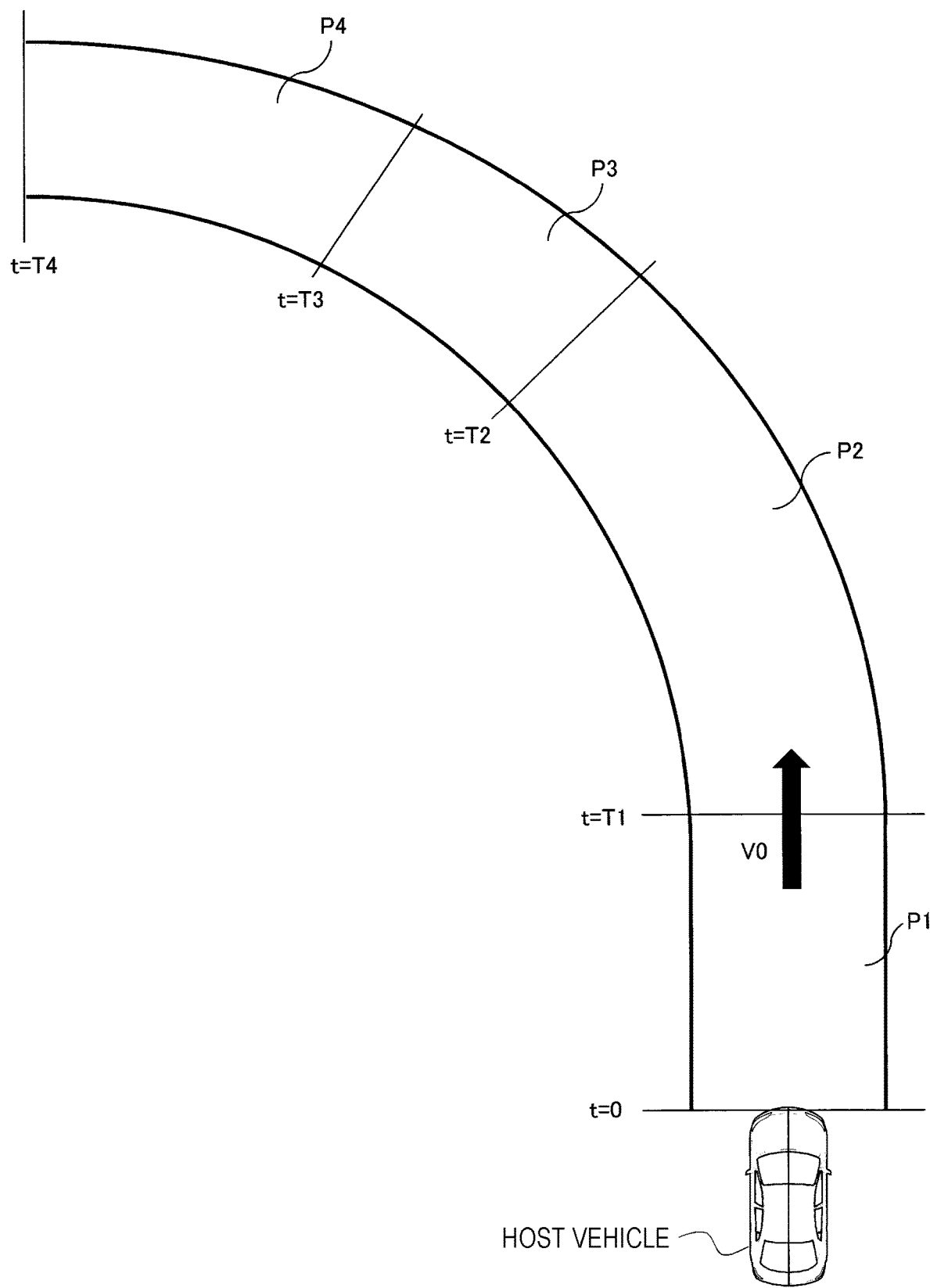
FIG. 1 is a conceptual diagram of cornering by one-side steering.
Figure 2:
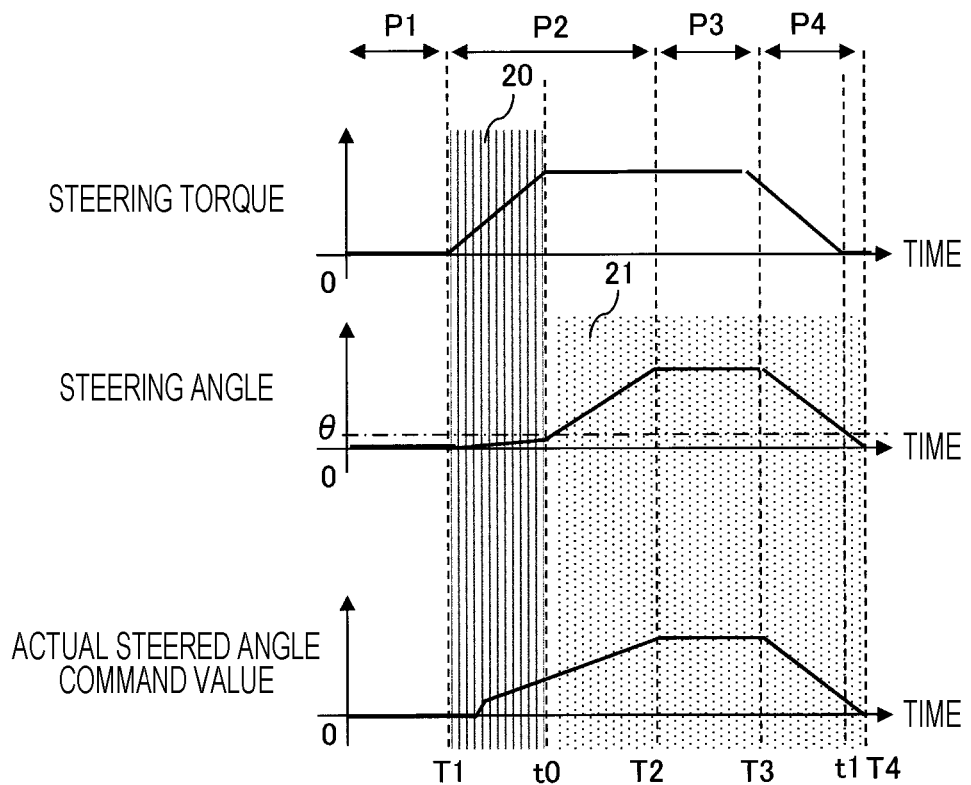
FIG. 2 is a view illustrating time histories of a steering torque, a steering angle, and an actual steered angle command value during cornering by one-side steering.

Prior to describing a specific embodiment, generation of an actual steered angle command value will be described with reference to FIGS. 1 to 3 so as to facilitate understanding of the present invention. FIG. 1 is a conceptual diagram of cornering by one-side steering, and is the conceptual diagram of a vehicle in which cornering by one-side steering is started at a constant speed V0 when time t=T1 and the cornering by one-side steering is finished when time t=T4. FIG. 2 illustrates time histories of a steering torque and a steering angle at the time of traveling a course of FIG. 1, and a time history of an actual steered angle command value calculated based on the steering torque and the steering angle. In addition, this calculation of the actual steered angle command value is not limited to the actual steered angle command value directly calculated from the steering torque and the steering angle described above. For example, a method of calculating a target yaw rate command value from the steering torque, the steering angle, and a vehicle model, and multiplying the calculated target yaw rate command value by a vehicle speed to finally calculate an actual steered angle command value may be used.

Figure 3A:
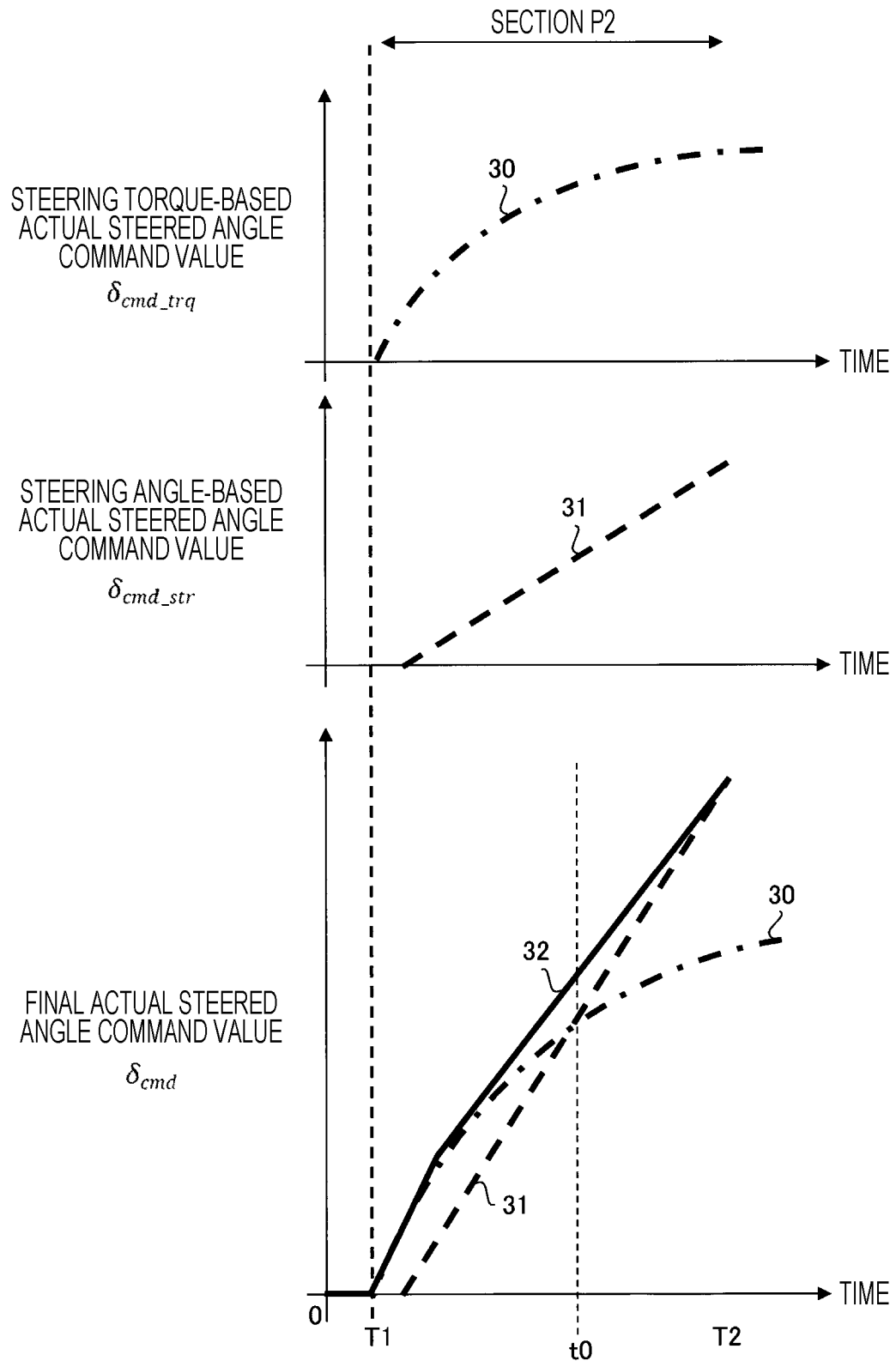
FIG. 3(a) is a view illustrating time histories of a steering torque-based actual steered angle command value and a steering angle-based actual steered angle command value and a relationship with a final actual steered angle command value based on the time histories in a section P2 illustrated in FIG. 2.
Figure 3B:
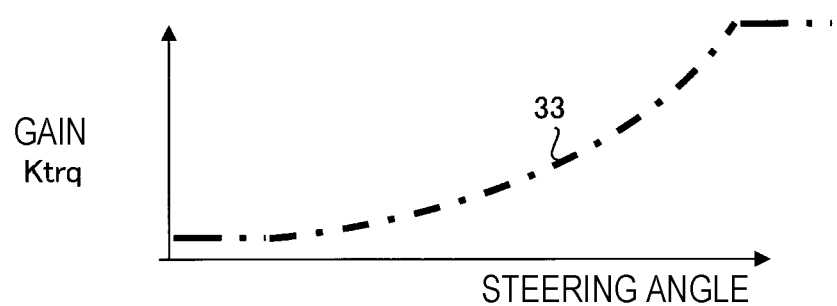
FIG. 3(b) is a view illustrating a relationship between a steering angle and a gain applied to a steering torque at the time of calculating an actual steered angle command value.
Figure 3C:
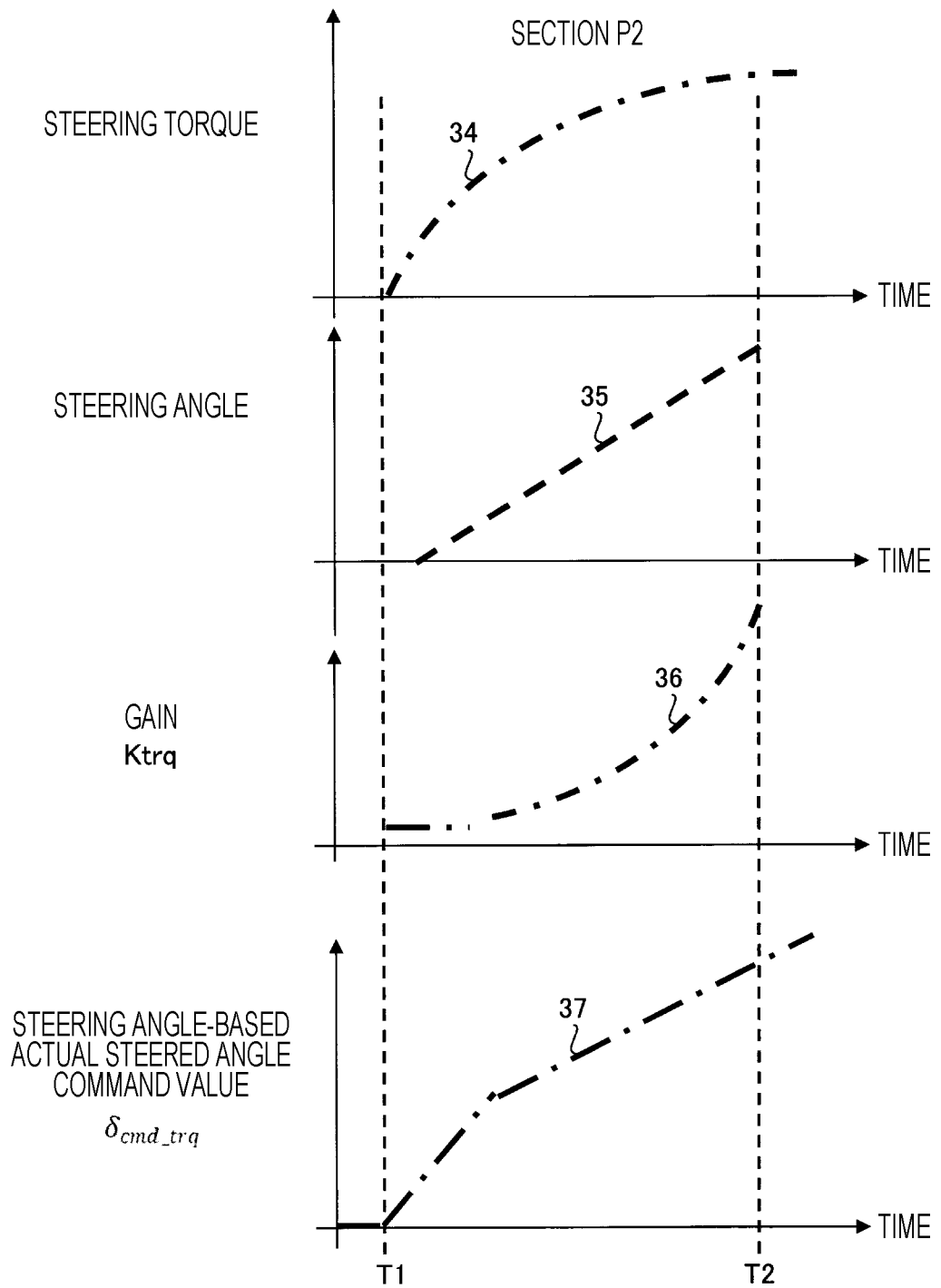
FIG. 3(c) is a view illustrating each relationship with a steering torque, a steering angle, a gain, and a steering torque-based actual steered angle command value in the section P2 illustrated in FIG. 2.
Figure 3D:
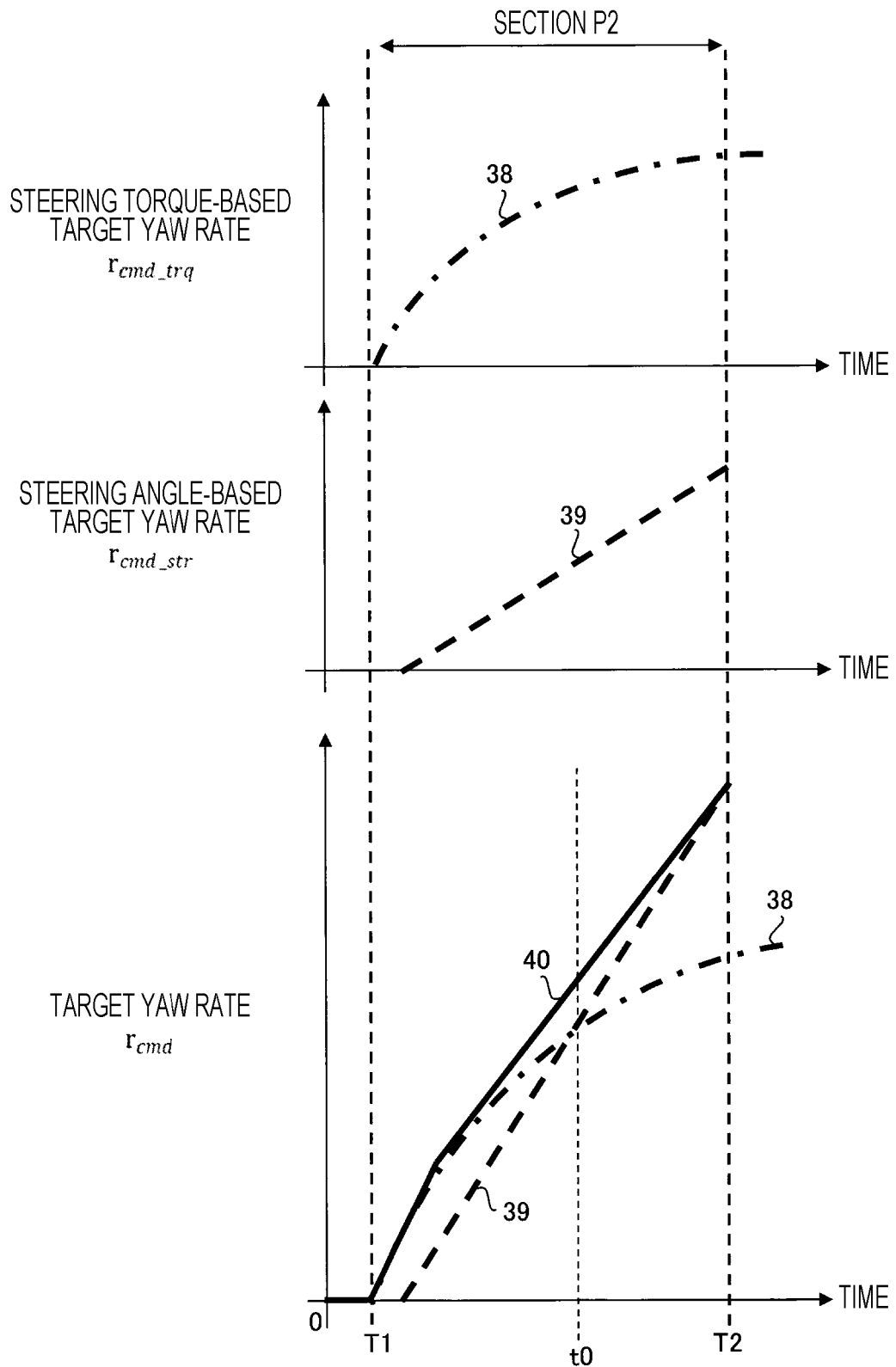
FIG. 3(d) is a view illustrating time histories of a steering torque-based target yaw rate and a steering angle-based target yaw rate, and a relationship with a target yaw rate based on the time histories in the section P2 illustrated in FIG. 2.

FIG. 3(a) is a view illustrating time histories of a steering torque-based actual steered angle command value and a steering angle-based actual steered angle command value and a relationship with a final actual steered angle command value based on the time histories in a section P2 illustrated in FIG. 2. FIG. 3(b) is a view illustrating a relationship between a steering angle and a gain applied to a steering torque at the time of calculating an actual steered angle command value. FIG. 3(c) is a view illustrating each relationship with a steering torque, a steering angle, a gain, and a steering torque-based actual steered angle command value in the section P2 illustrated in FIG. 2. FIG. 3(d) is a view illustrating time histories of a steering torque-based target yaw rate and a steering angle-based target yaw rate, and a relationship with a target yaw rate based on the time histories in the section P2 illustrated in FIG. 2.

In addition, in the present description, a travel route is divided into the following four sections (P1, P2, P3, and P4), and end times of the respective sections are denoted by T1, T2, T3, and T4 as illustrated in FIG. 1.

When time t=0 to T1, the vehicle (host vehicle) travels straight in the section P1 of FIG. 1, and a steering torque and a steering angle, which are inputs from a driver, become zero as illustrated in FIG. 2. Therefore, an actual steered angle command value in this section (section P1) is zero.

When time t=T1 to T2, the driver starts increasing the steering angle in the section P2 in FIG. 1. As illustrated in FIG. 2, at t=T1 to t0 when the steering angle is equal to or smaller than a predetermined steering angle θ, the steering torque rises, and the steering angle changes slightly. When the steering torque input from the driver is continued and the time elapses so that t=t0 to T2, the steering angle becomes equal to or larger than the predetermined steering angle θ, and the amount of change also increases. The actual steered angle command value is calculated according to such changes of the steering torque and the steering angle.

In a vertical stripe region 20 illustrated in FIG. 2, for example, a steering torque-based actual steered angle command value δcmd_trq, obtained by multiplying the steering torque by a certain gain Ktrq, is set as the actual steered angle command value. In a dotted-line region 21, for example, a steering angle-based actual steered angle command value δcmd_str, obtained by multiplying the steering angle by a gain δstr, is set as the actual steered angle command value. In the calculation of the actual steered angle command value at this time, as illustrated in FIG. 3(a), the steering torque-based actual steered angle command value δcmd_trq (30 in FIG. 3(a)) and the steering angle-based actual steered angle command value δcmd_str (31 in FIG. 3(a)) are calculated in the section P2, and a final actual steered angle command value δcmd (32 in FIG. 3(a)) is calculated so as to transition from the steering torque-based actual steered angle command value 30 to the steering angle-based actual steered angle command value 31 around time t0.

When time t=T2 to T3, the driver holds the steering angle in the section P3 of FIG. 1. As illustrated in FIG. 2, the steering angle is equal to or larger than the predetermined steering angle θ, and the actual steered angle command value is calculated by, for example, multiplying the steering angle by a steering angle gain as the calculation of the actual steered angle command value.

When time t=T3 to T4, the driver turns back the steering angle in the section P4 of FIG. 1. At time t=T3 to t1 when the steering angle is equal to or larger than the predetermined steering angle θ as illustrated in FIG. 2, the actual steered angle command value is calculated by, for example, multiplying the steering angle by the steering angle gain. In addition, the steering torque becomes minute at times t=t1 to T4 when the steering angle is equal to or smaller than the predetermined steering angle θ, and thus, the actual steered angle command value is calculated based on the steering angle.

Note that, as illustrated in FIGS. 3(b) and 3(c), a method of changing the gain Ktrq (33 in FIG. 3(b)) to be multiplied by a steering torque at the time of calculating an actual steered angle command value according to a steering angle, calculating the steering torque-based actual steered angle command value δcmd_trq (37 in FIG. 3(c)) by increasing the gain Ktrq (36 in FIG. 3(c)) according to an increase in an absolute value of the steering angle, and using the steering torque-based actual steered angle command value δcmd_trq, obtained by the calculation, as the actual steered angle command value δcmd (37 in FIG. 3(c)) may be used in addition to the above-described method.

As a method of creating the actual steered angle command value, not the actual steered angle itself but a yaw rate to be generated in the vehicle may be created as a target value. Specifically, as illustrated in FIG. 3(d), a method of creating a target yaw rate rcmd from a steering torque-based target yaw rate rcmd_trq created based on a steering torque and a steering angle-based target yaw rate rcmd_str created based on a steering angle, and calculating an actual steered angle command value such that the target yaw rate is generated in the vehicle may be used. A method of calculating an actual steered angle from a target yaw rate may be a method of using a vehicle speed and a vehicle model, or a method of generating the actual steered angle by multiplying the target yaw rate by a gain based on the vehicle speed. In addition, the method of creating the target yaw rate is not limited to the above-described method, and may be a method of creating the target yaw rate by multiplying a steering torque by a gain according to a steering angle as illustrated in FIG. 3(d).

According to the above methods, the actual steered angle command value according to the steering torque is calculated in a region where the steering angle is small, and the actual steered angle command value according to the steering angle is calculated as the steering angle increases. Thus, it is possible to realize turning performance according to the steering angle in a region where the steering angle is large, and to achieve both initial responsiveness and operability while improving vehicle turning responsiveness at the time of minute steering. In addition, improvement in turning responsiveness at the initial stage of steering enables traveling with a minute steering angle operation, for example, in a traveling scene where only a small turning motion is required as in a lane change during normal traveling. In addition, traveling is possible with a steering angle operation according to a turning direction in a traveling task requiring a large turning motion of the vehicle.

Next, generation of a steering reaction force command value will be described with reference to FIGS. 4 and 5.

Figure 4:
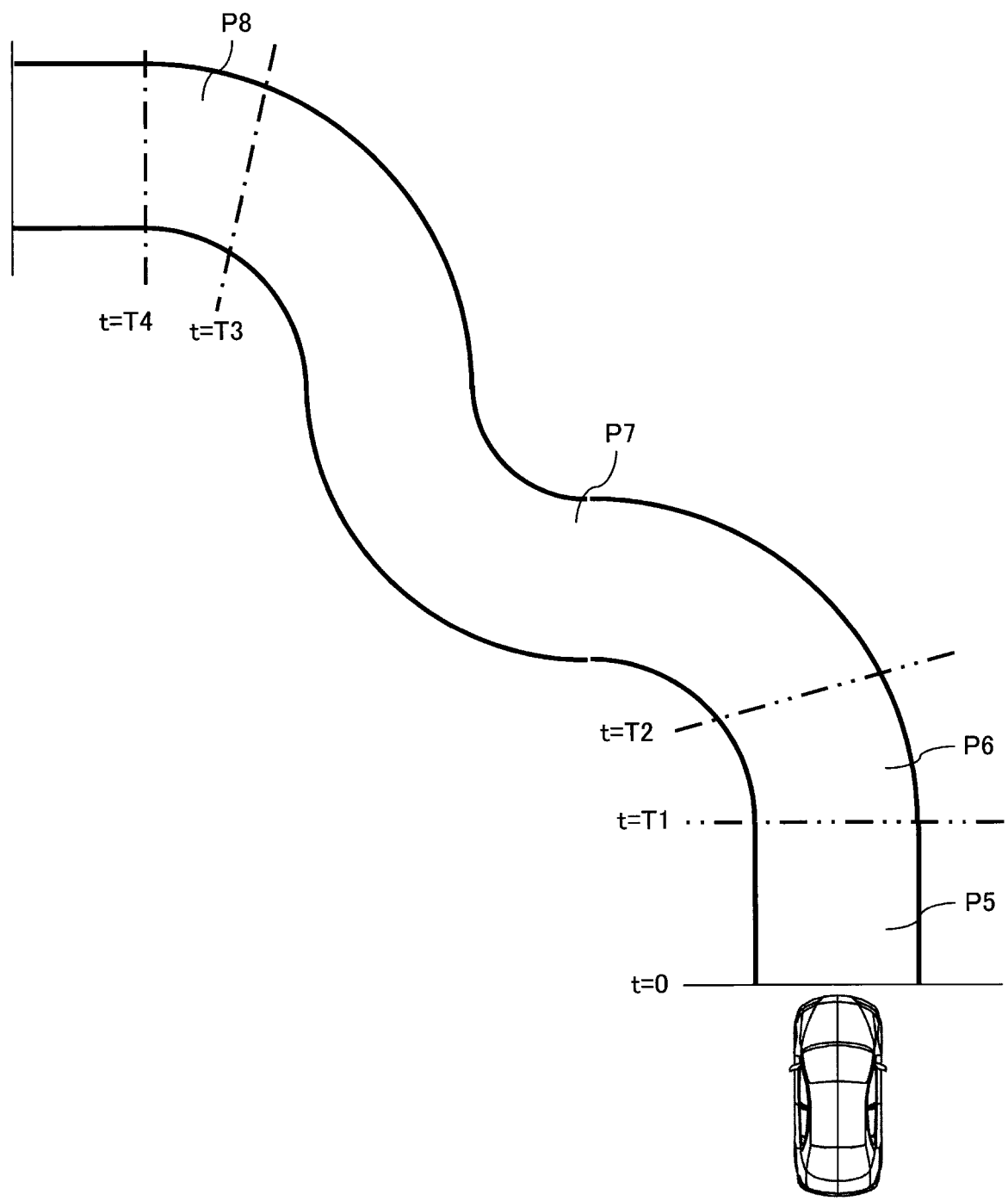
FIG. 4 is a conceptual view of cornering by continuous steering.

FIG. 4 is a conceptual diagram of cornering by continuous steering, and is the conceptual diagram of the vehicle in which S-shaped cornering is started at time t=T1 and the S-shaped cornering is finished at time t=T4 in a continuous S-shaped corner. FIG. 5 is a view illustrating time histories of a steering reaction force command value, a steering angle, a steering angular velocity, and a steering angular acceleration in cornering by continuous steering, which illustrates the time histories of the steering reaction force command value, the steering angle, the steering angular velocity, and the steering angular acceleration during traveling in the course of FIG. 4.

In the present description, an S-shaped travel route is divided into the following four sections (P5, P6, P7, and P8) as illustrated in FIG. 4, and end times of the respective sections are denoted by T1, T2, T3, and T4.

When the steering angle, the steering angular velocity, and the steering angular acceleration are minute in the section P5 of FIG. 4 at time t=0 to T1, it is determined that the driver travels straight without changing the steering angle, and the steering reaction force command value is increased such that the steering angle is stabilized at the neutral point. A method of increasing the steering reaction force command value may be a method of increasing the steering reaction force command value according to a vehicle speed during straight traveling, a method of increasing the steering reaction force command value according to a positive longitudinal acceleration (acceleration), or a method of increasing the steering reaction force command value according to a straight traveling time, and is preferably a method of increasing the steering reaction force command value such that the steering angle is stabilized at the neutral point during straight traveling.

Figure 5:
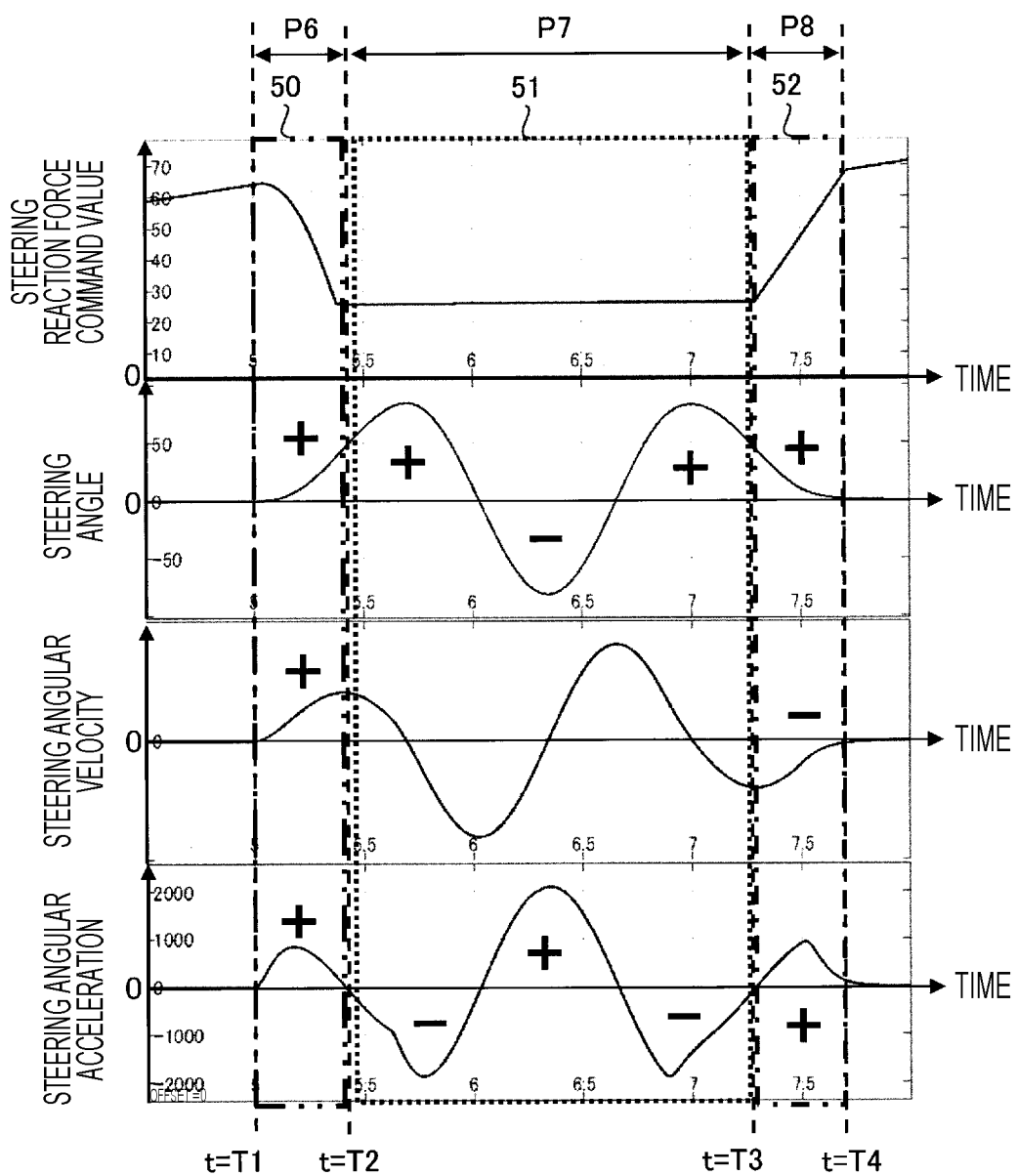
FIG. 5 is a view illustrating time histories of a steering reaction force command value, a steering angle, a steering angular velocity, and a steering angular acceleration in cornering by continuous steering.

When signs of the steering angle, the steering angular velocity, and the steering angular acceleration match as in a region 50 surrounded by a two-dot chain line in FIG. 5 in the section P6 in FIG. 4 at time t=T1 to T2, it is determined that the driver starts to increase the steering angle in order to change the steering angle, and the steering reaction force command value is decreased according to the steering angle, for example, such that a steering wheel operation becomes easy.

When the signs of the steering angle and the steering angular acceleration do not match as in a region 51 surrounded by a dotted line in FIG. 5 in the section P7 in FIG. 4 at time t=T2 to T3, it is determined that the driver performs continuous steering, and the steering reaction force command value is maintained so as to facilitate the continuous steering.

When the signs of the steering angle and the steering angular acceleration match and the signs of the steering angle and the steering angular velocity do not match as in a region 52 surrounded by a one-dot chain line in FIG. 5 in the section P8 in FIG. 4 at time t=T3 to T4, it is determined as a scene in which the driver starts to turning back the steering angle to return the steering angle to the neutral point, and the steering reaction force command value is increased according to the steering angle such that the steering angle is stabilized at the neutral point.

In this manner, the steering wheel operation becomes easy during the cornering in which the change of the steering angle increases by decreasing the steering reaction force command value when the steering angle increases and increasing the steering reaction force command value when the steering angle decreases, and the steering is easily held near the neutral point of the steering angle during straight traveling.

Hereinafter, examples of the present invention will be described with reference to the drawings.

EXAMPLE 1

Figure 6:
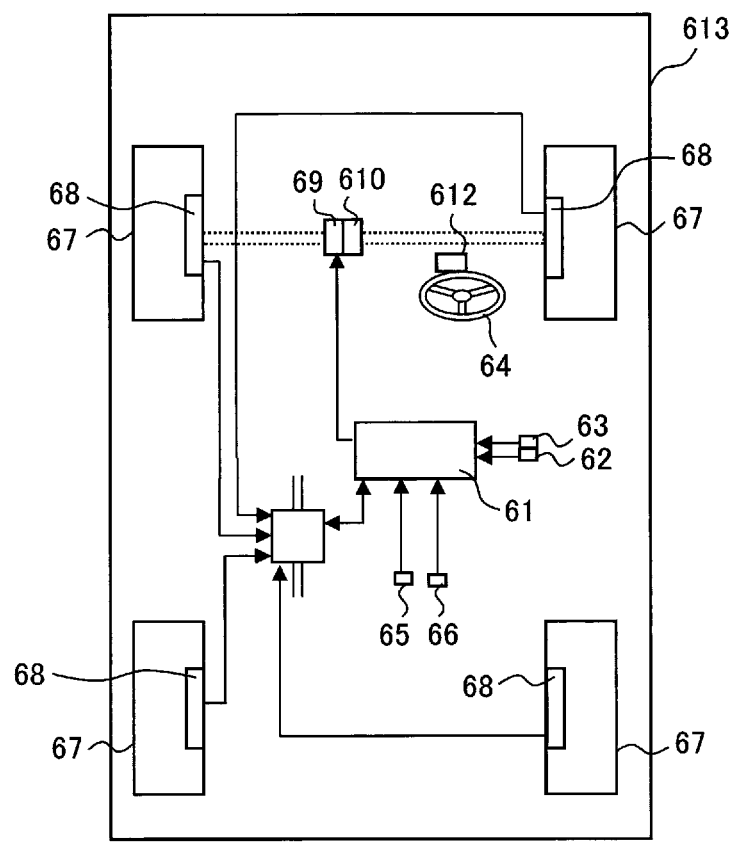
FIG. 6 is a conceptual diagram of a vehicle equipped with a steering control device of Example 1 according to one example of the present invention.

FIG. 6 is a conceptual diagram of a vehicle equipped with a steering control device of Example 1 according to one example of the present invention. As illustrated in FIG. 6, a steering control device 61 is mounted on a vehicle 613, performs calculation necessary for steering control based on each piece of information obtained from an acceleration sensor 62, a gyro sensor 63, and a wheel speed sensor 68, which acquire information on a vehicle motion state and a steering angle sensor 65 and a steering torque sensor 66 that acquire operation information from a driver, and transmits an actual steered angle command value to an actual steered angle control unit 69, which drives and controls an actual steered angle actuator 610, via a communication line based on a result of the calculation.

In addition, a signal transmitted from the steering control device 61 is not an actual steered angle itself, and is preferably a control command value (signal) that can realize steered angle control by the actual steered angle actuator 610.

The sensors that acquire the information on the above-described vehicle motion state are not limited to the acceleration sensor 62, the gyro sensor 63, and the wheel speed sensor 68. A vehicle speed may be acquired using position coordinates obtained from a global positioning system, or a longitudinal acceleration or a lateral acceleration may be acquired using an external world recognition sensor such as a camera and a sonar. Further, the steering control device 61 does not necessarily get a direct input from the sensor, and for example, may be configured to acquire necessary information from another control unit via the communication line.

The sensors that acquire the operation information from the driver are not limited to the steering angle sensor 65 and the steering torque sensor 66, and may be other sensors as long as an operation amount of the steering wheel 64 can be acquired. In addition, the steering control device 61 does not necessarily get a direct input from the sensor, and for example, may be configured to acquire necessary information from another control unit via the communication line, similarly to the above-described information on the vehicle motion state.

Regarding a steering reaction force of the present example, the steering reaction force is generated not by the above-described calculation of the steering reaction force command value but by a simulated steering reaction force generation device 612 having a spring mass damper system with respect to a change of a steering angle. In addition, the generation of the steering reaction force is not limited to the spring mass damper system with respect to the change of the steering angle, and any mechanism that generates a force that restores the steering angle to the neutral point may be used.

As the communication line, different communication lines and communication protocols may be used depending on a signal. For example, it may be configured such that Ethernet (registered trademark) is used for communication with a sensor that acquires host vehicle travel path information required to exchange a large amount of data, and a controller area network (CAN) is used for communication with each actuator.

Figure 7:
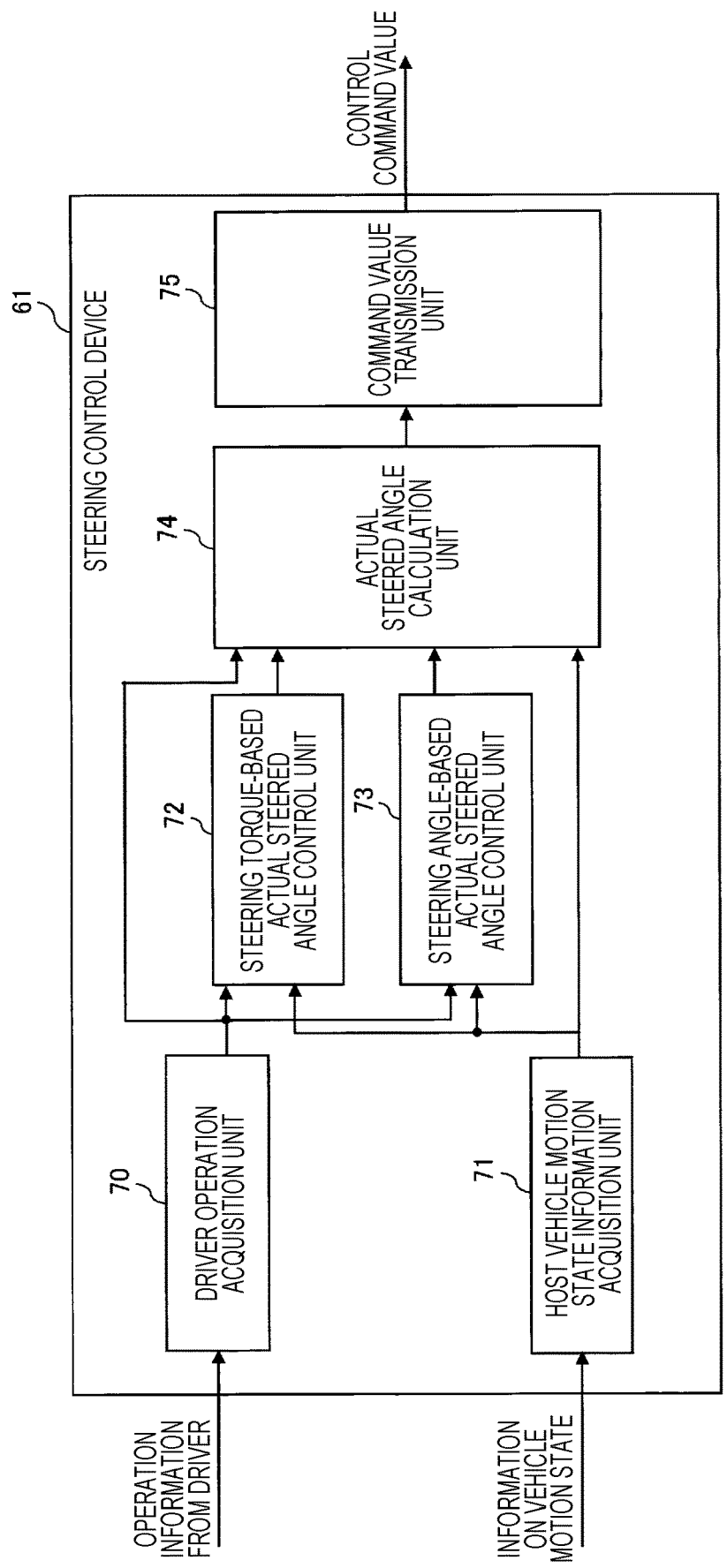
FIG. 7 is a functional block diagram of the steering control device illustrated in FIG. 6.

FIG. 7 is a functional block diagram of the steering control device 61 illustrated in FIG. 6. As illustrated in FIG. 7, the steering control device 61 includes a driver operation acquisition unit 70, a host vehicle motion state information acquisition unit 71, a steering torque-based actual steered angle control unit 72, a steering angle-based actual steered angle control unit 73, an actual steered angle calculation unit 74, and a command value transmission unit 75. Here, the driver operation acquisition unit 70, the host vehicle motion state information acquisition unit 71, the steering torque-based actual steered angle control unit 72, the steering angle-based actual steered angle control unit 73, the actual steered angle calculation unit 74, and the command value transmission unit 75 are realized by, for example, a processor such as a central processing unit (CPU) (not illustrated), a ROM that stores various programs, a RAM that temporarily stores data in a calculation process, and a storage device such as an external storage device. The processor such as the CPU reads and executes the various programs stored in the ROM, and stores a calculation result, which is an execution result, in the RAM or the external storage device.

The driver operation acquisition unit 70 acquires the operation information (a steering angle operation amount and a steering torque input amount) from the driver.

The host vehicle motion state information acquisition unit 71 acquires the information on the vehicle motion state (a vehicle speed, a longitudinal acceleration, a lateral acceleration, and the like).

The steering torque-based actual steered angle control unit 72 calculates a steered angle command value according to the above-described steering torque from the steering torque and the vehicle speed based on the information obtained by the driver operation acquisition unit 70 and the host vehicle motion state information acquisition unit 71, and sends a result of the calculation to the actual steered angle calculation unit 74. Here, the steered angle command value may be a target actual steered angle command value calculated directly using an actual steered angle, which is a steered angle of a tire 67, as a target value, or a target yaw rate command value calculated using a yaw rate, which is a turning speed of the vehicle 613, as a target value. As a calculation method, for example, the methods illustrated in FIGS. 1 to 3 described above are used. In addition, the steered angle command value is calculated such that the yaw rate or the lateral acceleration becomes constant at the time of holding the steering (making the torque or steering angle constant).

The steering angle-based actual steered angle control unit 73 calculates a steered angle command value based on the information obtained by the driver operation acquisition unit 70 and the host vehicle motion state information acquisition unit 71, and sends a result of the calculation to the actual steered angle calculation unit 74. Here, the steering angle command value may be a target actual steered angle command value calculated directly using an actual steered angle, which is a steered angle of the tire 67, as a target value, or a target yaw rate command value calculated using a yaw rate, which is a turning speed of the vehicle 613, as a target value, and is preferably a target value of the same dimension as the target value calculated by the steering torque-based actual steered angle control unit 72. As a calculation method of the target actual steered angle command value, for example, the methods illustrated in FIGS. 1 to 3 described above are used. In addition, the steered angle command value is calculated such that the yaw rate or the lateral acceleration becomes constant at the time of holding the steering (making the torque or steering angle constant).

The actual steered angle calculation unit 74 calculates a steering torque-based actual steered angle command value from the steered angle command value by the steering torque-based actual steered angle control unit 72 based on the information obtained by the driver operation acquisition unit 70, the host vehicle motion state information acquisition unit 71, the steering torque-based actual steered angle control unit 72, and the steering angle-based actual steered angle control unit 73, calculates a steering angle-based actual steered angle command value from the steered angle command value by the steering angle-based actual steered angle control unit 73, calculates a final actual steered angle command value, and sends the final actual steered angle command value to the command value transmission unit 75. As a calculation method, for example, the methods illustrated in FIGS. 1 to 3 described above are used.

The command value transmission unit 75 sends the actual steered angle command value to the actual steered angle control unit 69, which performs drive control of the actual steered angle actuator 610 capable of controlling the actual steered angle of the tire, based on the actual steered angle command value generated by the actual steered angle calculation unit 74.

Figure 8:
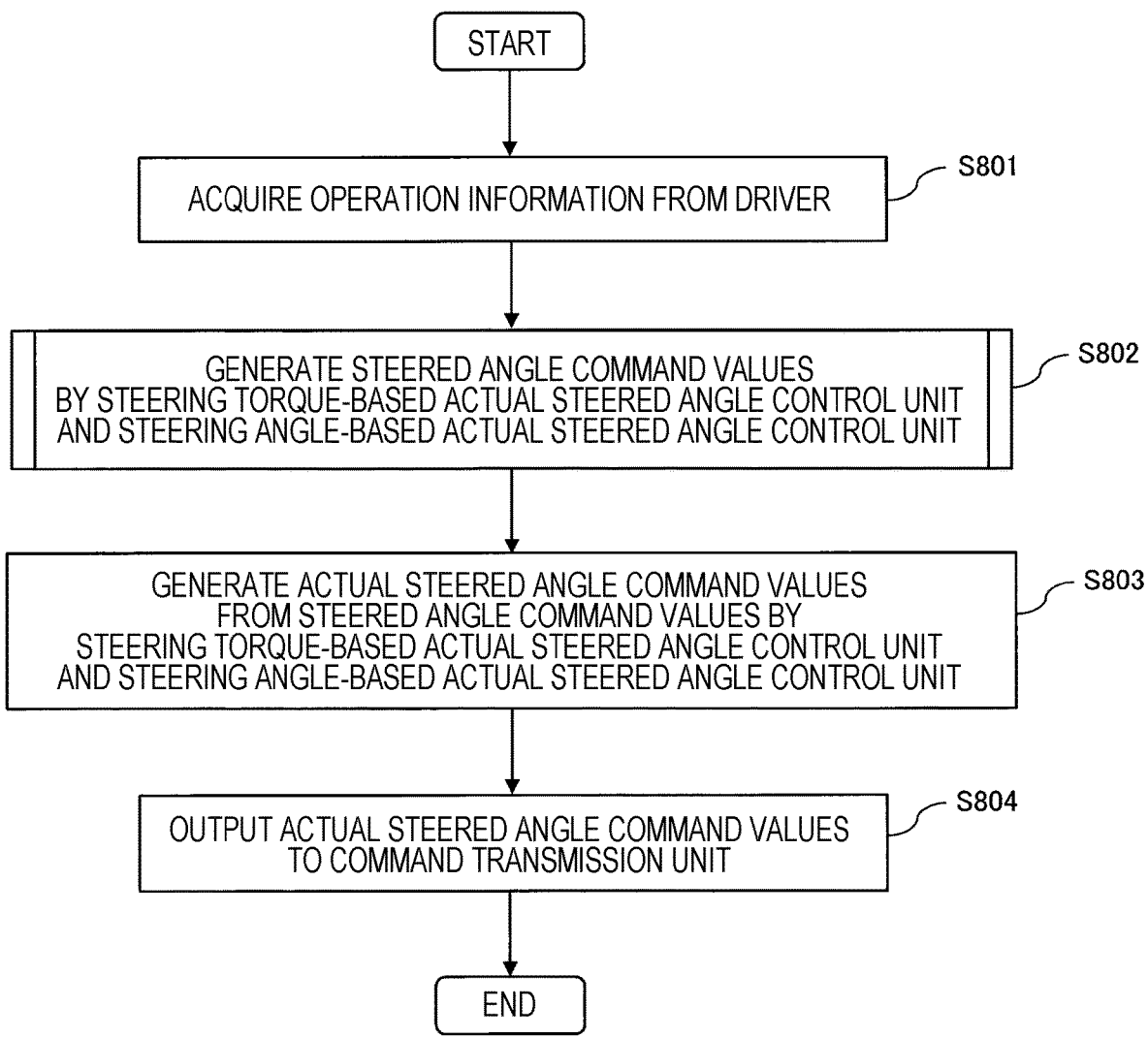
FIG. 8 is a flowchart for describing an operation in actual steered angle command value generation of the steering control device illustrated in FIG. 7.

Next, a processing procedure of the steering control device 61 will be described using a flowchart. FIG. 8 is a flowchart for describing an operation in actual steered angle command value generation of the steering control device 61 illustrated in FIG. 7. In Step S801, the driver operation acquisition unit 70 and the host vehicle motion state information acquisition unit 71 acquire operation information from a driver and information on a vehicle motion state, and then, the processing proceeds to Step S802.

In Step S802, the steering torque-based actual steered angle control unit 72 generates a steering torque-based steered angle command value using the information acquired in Step S801, the steering angle-based actual steered angle control unit 73 generates a control parameter-based steered angle command value, and the generated values are output to the actual steered angle calculation unit 74. Next, the processing proceeds to Step S803.

In Step S803, the actual steered angle calculation unit 74 generates an actual steered angle command value from the steering torque-based steered angle command value of the steering torque-based actual steered angle control unit 72 and the steering angle-based steered angle command value of the steering angle-based actual steered angle control unit 73 using the information acquired in Step S801 and the information acquired in Step S802, and the processing proceeds to Step S804.

In Step S804, the actual steered angle command value acquired in Step S803 is output to the command value transmission unit 75, and a series of processes ends.

Figure 9:
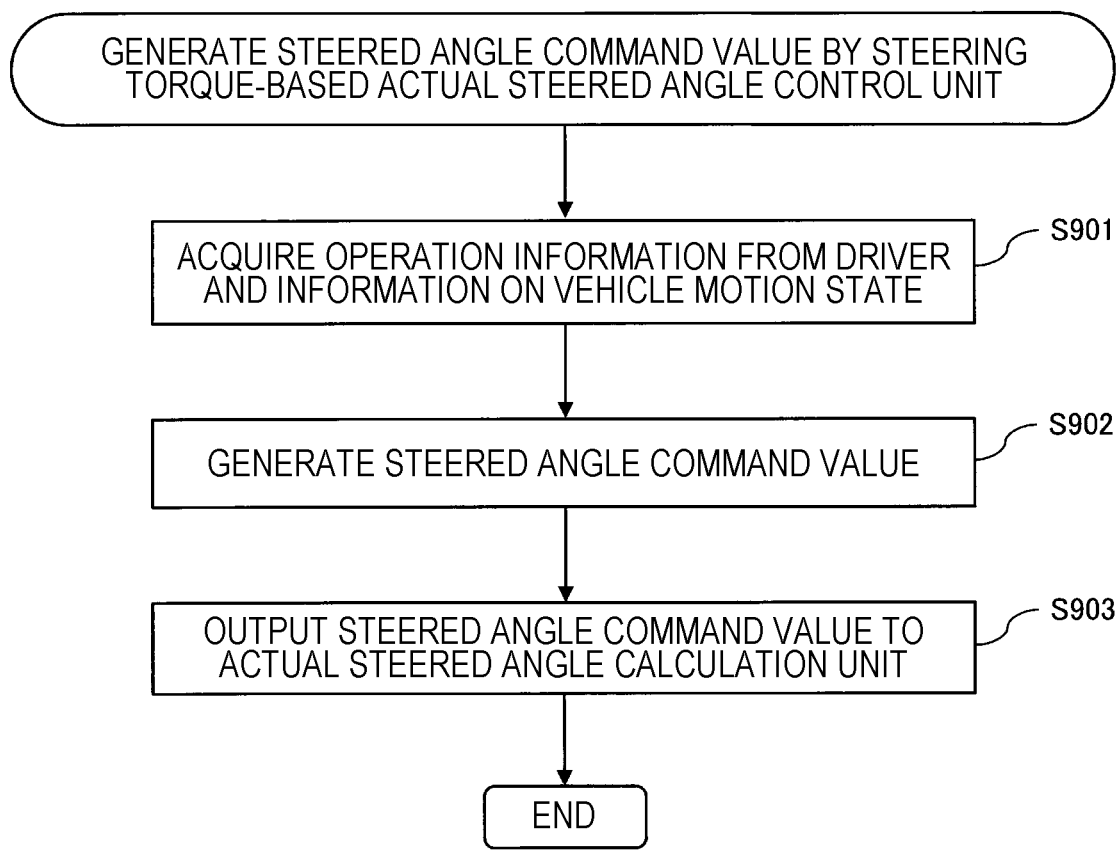
FIG. 9 is a flowchart for describing an operation in a steering torque-based actual steered angle control unit forming the steering control device illustrated in FIG. 7.

Next, a processing procedure of the steering torque-based actual steered angle control unit 72 will be described using a flowchart. FIG. 9 is a flowchart for describing an operation in the steering torque-based actual steered angle control unit 72 forming the steering control device 61 illustrated in FIG. 7, and is a detailed flow of Step S802 in FIG. 8 described above.

As illustrated in FIG. 9, in Step S901, information on a steering torque and a vehicle motion state is acquired, and the processing proceeds to Step S902.

In Step S902, the steering torque-based actual steered angle control unit 72 generates a steered angle command value according to the steering torque using the information acquired in Step S901, and the processing proceeds to Step S903.

In Step S903, the generated steered angle command value is output to the actual steered angle calculation unit 74, and a series of processes ends.

Figure 10:
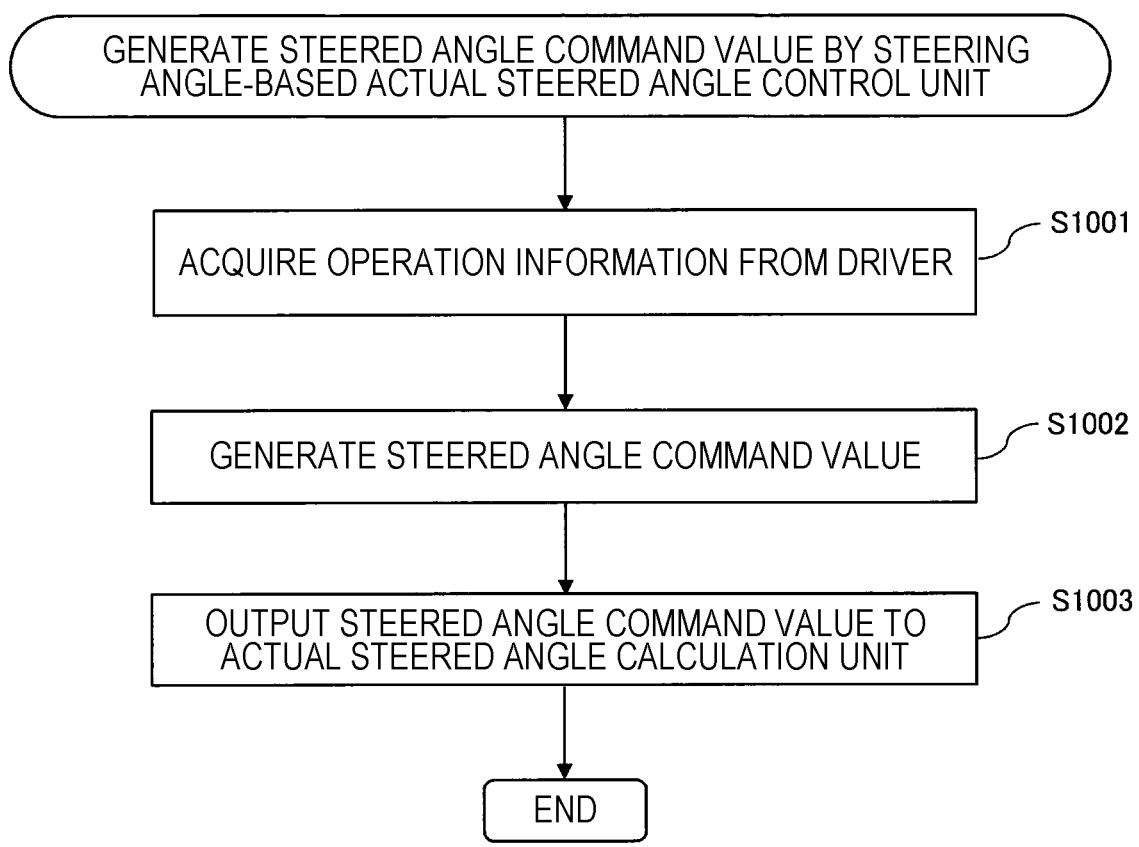
FIG. 10 is a flowchart for describing an operation in a steering angle-based actual steered angle control unit forming the steering control device illustrated in FIG. 7.

Next, a processing procedure of the steering angle-based actual steered angle control unit 73 will be described with reference to a flowchart. FIG. 10 is a flowchart for describing an operation in the steering angle-based actual steered angle control unit 73 forming the steering control device 61 illustrated in FIG. 7, and is a detailed flow of Step 802 in FIG. 8 described above.

As illustrated in FIG. 10, a steering torque and a steering angle are acquired in Step S1001, and the processing proceeds to Step S1002.

In Step S1002, the steering angle-based actual steered angle control unit 73 generates a steered angle command value from the steering angle using the information acquired in Step S1001, and the processing proceeds to Step S1005. In addition, the calculation by the steering angle-based actual steered angle control unit 73 here is not limited to an input parameter based on the steering angle described above as long as the steered angle command value according to the steering angle can be generated. For example, the steered angle command value may be generated by changing a gain Ktrq to be multiplied by a steering torque according to a steering angle and multiplying the steering torque by the gain Ktrq.

In Step S1003, the generated steered angle command value is output to the actual steered angle calculation unit 74, and a series of processes ends.

In addition, when the steering torque and/or the steering angle are smaller than a predetermined value, a dead zone for setting the steered angle command value to zero may be provided as a parameter at the time of calculating the actual steered angle command value.

As the actual steered angle of the vehicle and the steering reaction force of the steering wheel are controlled with the above configuration, it is possible to prevent the actual steered angle of the vehicle 613 from varying due to a minute steering torque or/and a minute steering angle unintentionally input to the steering wheel by the driver. In addition, when the steering torque decreases to a minute amount, the steering angle and the actual steered angle can be returned to zero along with the decrease of the steering torque.

In addition, parameters (a gain and a dead zone threshold) at the time of creating the actual steered angle command value may be changed according to a traveling scene in the present example. For example, when a traveling speed and a shift position can be acquired and it is determined from these pieces of information that the traveling scene is the time of parking, steering with a large steering angle is required, and thus, the gain is increased such that a large actual steered angle can be generated with less steering wheel operation by the driver.

In addition, when a state where a steering angle continuously changes is detected and it is determined that the vehicle is traveling on a winding road, the gain is adjusted such that a yaw rate is linearly generated with respect to the change of the steering angle. In this manner, the operability of the driver can be improved by adjusting the gain according to the traveling scene.

As described above, according to the present example, it is possible to provide the steering control device capable of reducing the steering amount while securing the operability of the driver according to the traveling condition.

In addition, in a case where the steering angle is still minute at a timing when the driver applies a force to the steering wheel to generate the actual steered angle in the vehicle, it is possible to realize a turning motion with highly responsiveness for an intention of the driver who desires turning by calculating the actual steered angle command value based on the steering torque. In addition, the processing transitions to the calculation of the actual steered angle command value based on the steering angle as the steering angle increases, and thus, it is possible to secure the conventional operability of turning the steering wheel for cornering.

EXAMPLE 2

Figure 11:
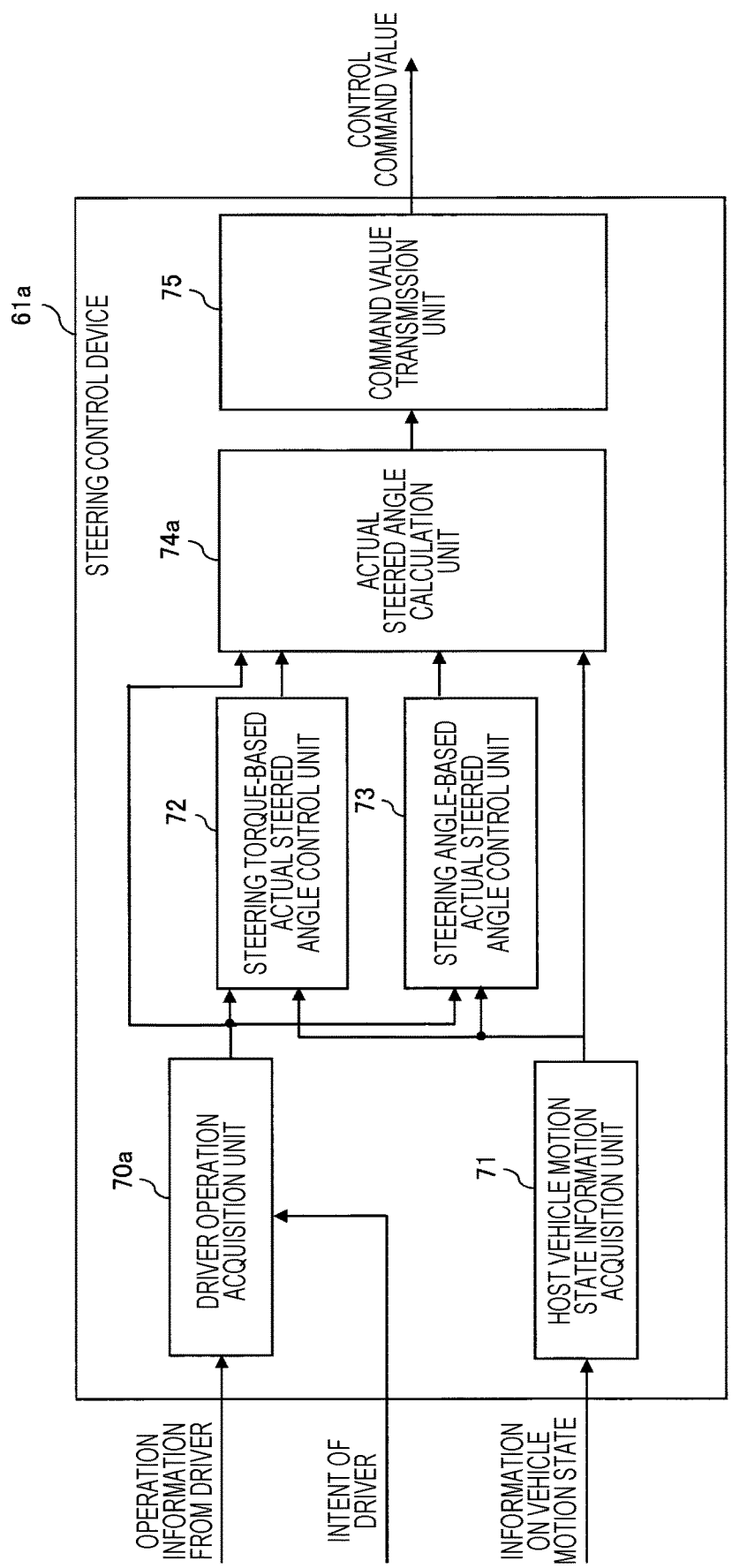
FIG. 11 is a functional block diagram of a steering control device of Example 2 according to another example of the present invention.

FIG. 11 is a functional block diagram of a steering control device 61a of Example 2 according to another example of the present invention. The present example is different from Example 1 in that a driver operation acquisition unit 70*a* is configured to further input an intention or the like of a driver in addition to operation information from the driver. The same components as those in Example 1 are denoted by the same reference signs, and redundant descriptions will be omitted below.

As illustrated in FIG. 11, the driver operation acquisition unit 70*a* acquires the intention of the driver in addition to the operation information (a steering angle operation amount, a steering torque input amount, and the like) from the driver. Here, a parameter reflecting the intention of the driver may be set by an input from the driver through a user interface, may be set by automatic learning and automatic tuning from driving by the driver, or may be set using a method of reflecting a value set in advance for each driver by driver authentication.

An actual steered angle calculation unit 74*a* calculates an actual steered angle command value from a steered angle command value obtained by the steering torque-based actual steered angle control unit 72 when a steering angle is smaller than a predetermined steering angle based on information obtained by the driver operation acquisition unit 70, the host vehicle motion state information acquisition unit 71, the steering torque-based actual steered angle control unit 72, and the steering angle-based actual steered angle control unit 73, and calculates an actual steered angle command value from a steered angle command value obtained by the steering angle-based actual steered angle control unit 73 when the steering angle is equal to or larger than the predetermined steering angle. The calculated actual steered angle command value is sent to the command value transmission unit 75. As a calculation method, for example, the methods illustrated in FIGS. 1 to 3 described above are used. In addition, at least one of the predetermined steering angle, a gain Ktrq at the time of calculating the steered angle command value based on a steering torque, and a gain Kstr at the time of calculating the steered angle command value based on the steering angle is increased or decreased by a parameter reflecting the driver's intention obtained by the driver operation acquisition unit 70. For example, in a case where there are two modes of a normal mode and a sport mode as the driver's intention, the gain Ktrq and the gain Kstr may be set to be larger in the sport mode than in the normal mode. In addition, these modes are not limited to the method selected by the driver, and may adopt a method of directly setting the gain Ktrq, the gain Kstr, and/or the steering angle that changes from the steering torque base to the steering angle base. In addition, a method of changing these values based on a driving behavior of the driver may be adopted. For example, in a case where a steering angle change is performed more frequently than a reference steering model in a driver's operation at the time of turning on a single curved road, the above-described respective parameters may be changed such that the frequency of the steering angle change decreases.

As described above, according to the present example, it is possible to adjust operability of a steering wheel and responsiveness of steering to settings suitable for the driver's intention by reflecting the driver's intention to switching between actual steered angle control based on the steering torque and actual steered angle control based on the steering angle and turning responsiveness with respect to the steering torque and the steering angle, in addition to the effects of Example 1.

EXAMPLE 3

Figure 12:
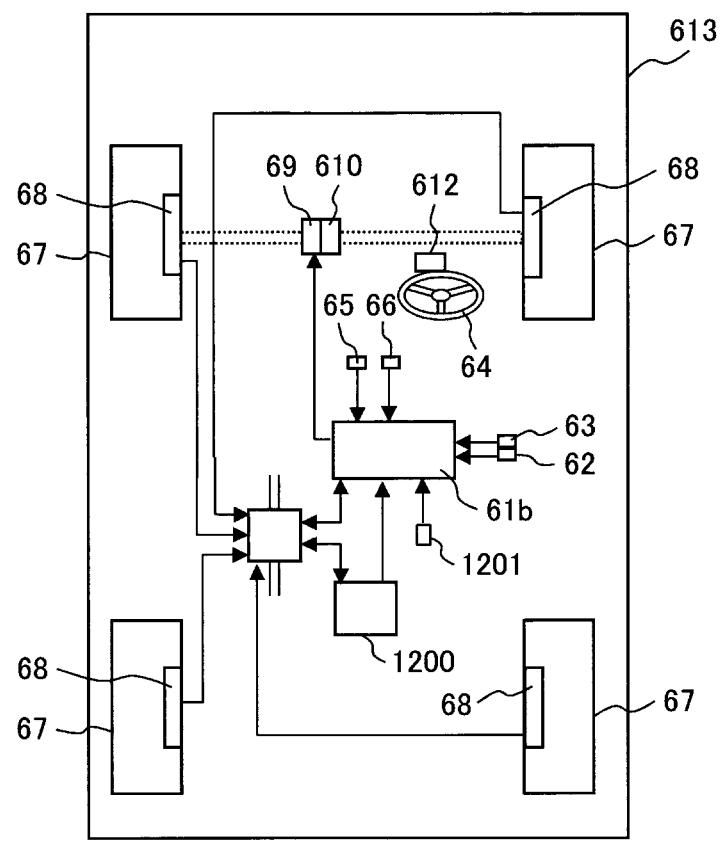
FIG. 12 is a conceptual diagram of a vehicle equipped with a steering control device of Example 3 according to still another example of the present invention.
Figure 13:
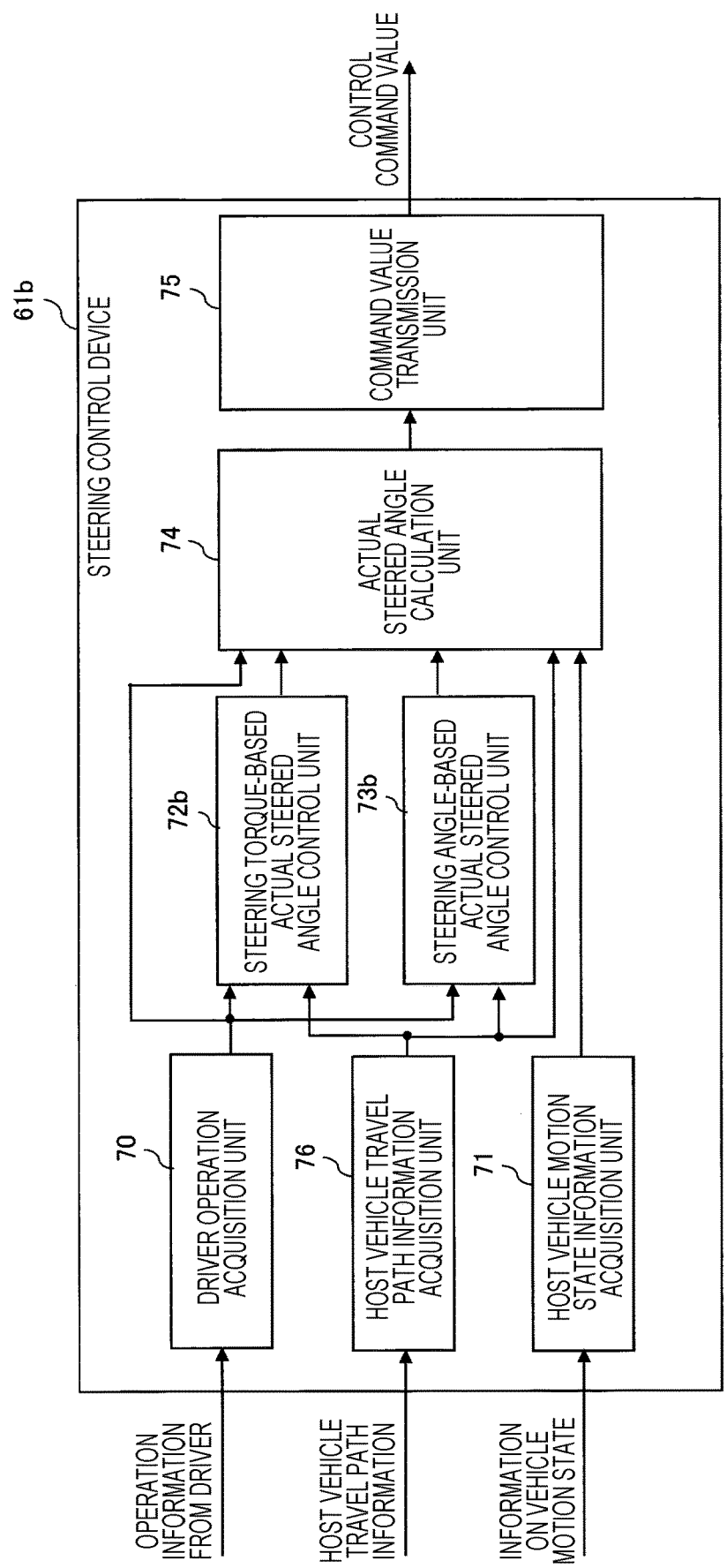
FIG. 13 is a functional block diagram of the steering control device illustrated in FIG. 12.

FIG. 12 is a conceptual diagram of a vehicle equipped with a steering control device 61*b* of Example 3 according to still another example of the present invention, and FIG. 13 is a functional block diagram of the steering control device 61*b* illustrated in FIG. 12. The present example is different from Example 1 in that the steering control device 61*b* further includes a host vehicle travel path information acquisition unit 76. The same components as those in Example 1 are denoted by the same reference signs, and redundant descriptions will be omitted below.

As illustrated in FIG. 12, the steering control device 61*b* according to the present example is mounted on the vehicle 613, performs calculation necessary for steering control based on each piece of information obtained from the acceleration sensor 62, the gyro sensor 63, and the wheel speed sensor 68, which acquire information on a vehicle motion state and the steering angle sensor 65 and the steering torque sensor 66 that acquire operation information from a driver and a host vehicle position detection sensor 1200 and an external environment information detection sensor 1201, which acquire host vehicle travel information, performs calculation necessary for steering control, and transmits an actual steered angle command value to the actual steered angle control unit 69, which drives and controls the actual steered angle actuator 610, via a communication line based on a result of the calculation.

A global positioning system is used as the host vehicle position detection sensor 1200 as a sensor that acquires the host vehicle travel path information, and a sensor capable of acquiring obstacle information around a host vehicle such as a camera and a sonar and detecting a travelable region is used as the external environment information detection sensor 1201. In addition, the present invention is not limited to the above-described sensor as long as host vehicle peripheral information and a travelable region can be acquired. Furthermore, the steering control device 61*b* does not necessarily get a direct input from the sensor, and for example, may be configured to acquire necessary information from another control unit via the communication line, similarly to the above-described information on the vehicle motion state.

As illustrated in FIG. 13, the steering control device 61*b* includes the driver operation acquisition unit 70, the host vehicle motion state information acquisition unit 71, the host vehicle travel path information acquisition unit 76, a steering torque-based actual steered angle control unit 72*b*, a steering angle-based actual steered angle control unit 73*b*, the actual steered angle calculation unit 74, and the command value transmission unit 75.

The host vehicle travel path information acquisition unit 76 acquires host vehicle travel path information (the host vehicle peripheral information and the travelable region, and the like).

The steering torque-based actual steered angle control unit 72*b* calculates a steered angle command value according to a steering torque from a steering torque and a vehicle speed based on the information obtained by the driver operation acquisition unit 70, the host vehicle motion state information acquisition unit 71, and the host vehicle travel path information acquisition unit 76 and sends a result of the calculation to the actual steered angle calculation unit 74. This steered angle command value may be a target actual steered angle command value or a target yaw rate command value. As a calculation method, for example, the methods illustrated in FIGS. 1 to 3 described above are used. In addition, when it is determined that a vehicle is parked based on the host vehicle peripheral information and the travelable region of the host vehicle travel path information acquisition unit 76, a torque gain for the steering torque is increased.

The steering angle-based actual steered angle control unit 73b calculates a steered angle command value based on the information obtained by the driver operation acquisition unit 70, the host vehicle motion state information acquisition unit 71, and the host vehicle travel path information acquisition unit 76, and sends a result of the calculation to the actual steered angle calculation unit 74. This steered angle command value may be a target actual steered angle command value or a target yaw rate command value. As a calculation method, for example, the methods illustrated in FIGS. 1 to 3 described above are used. In addition, when it is determined that the vehicle is parked based on the host vehicle peripheral information and the travelable region of the host vehicle travel path information acquisition unit 76, a steering angle gain with respect to the steering angle is increased.

Figure 14:
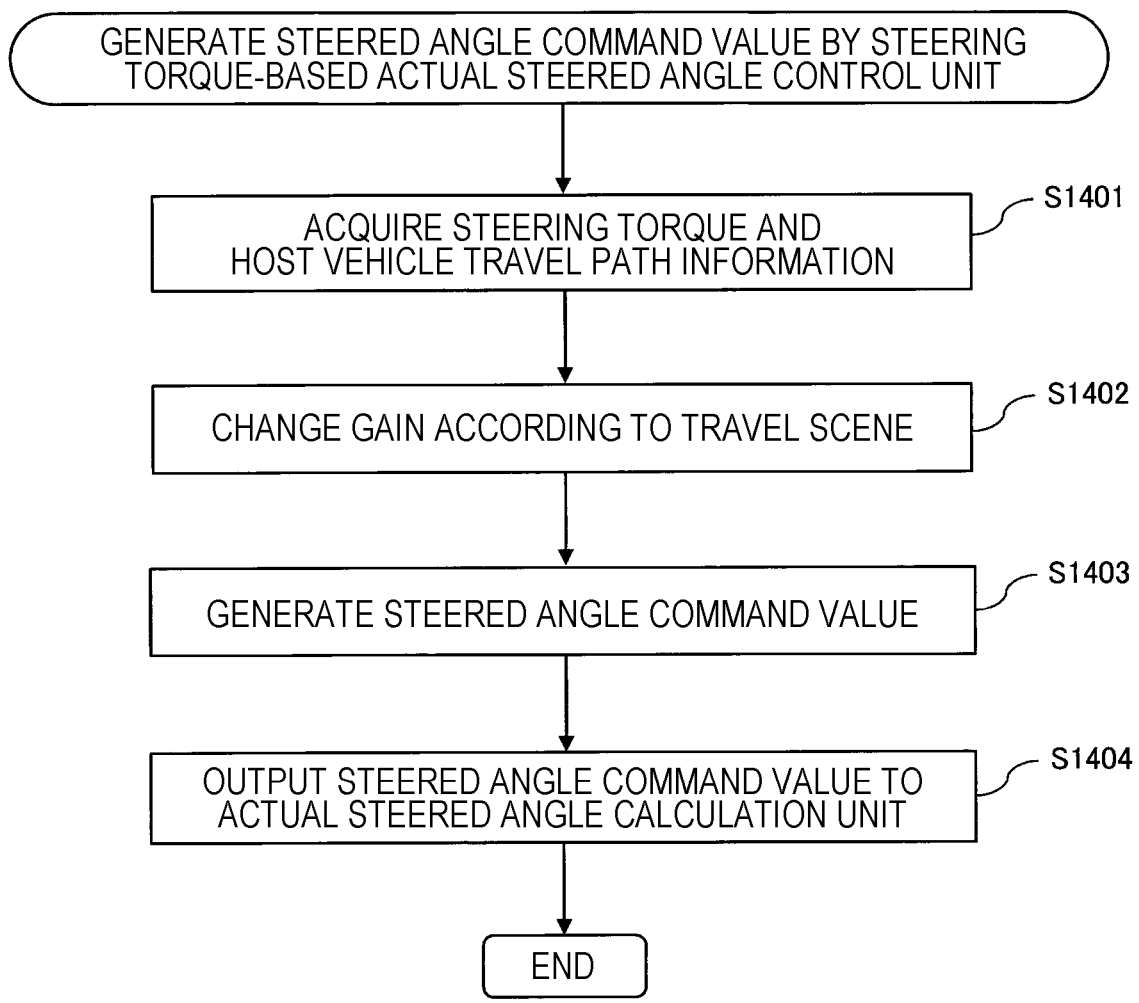
FIG. 14 is a flowchart for describing an operation in a steering torque-based actual steered angle control unit forming the steering control device illustrated in FIG. 12.

Next, a processing procedure of the steering torque-based actual steered angle control unit 72b will be described using a flowchart. FIG. 14 is a flowchart for describing an operation in the steering torque-based actual steered angle control unit 72b forming the steering control device 61b illustrated in FIG. 12.

As illustrated in FIG. 14, a steering torque and host vehicle travel path information are acquired in Step S1401, and the processing proceeds to Step S1402.

In Step S1402, the gain Ktrq is increased or decreased according to a traveling scene from the host vehicle travel path information based on the information acquired in Step S1401, and the processing proceeds to Step S1403. In this gain setting, for example, steering with a large steering angle is required in a case where the traveling scene is the time of parking, and thus, the gain is increased such that a large actual steered angle can be generated with a small amount of steering wheel operation by the driver.

In Step S1403, the steering torque-based actual steered angle control unit 72b generates a steered angle command value from the steering torque and the gain Ktrq using the information acquired in Steps S1401 and S1402, and the processing proceeds to Step S1404.

In Step S1404, the generated steered angle command value is output to the actual steered angle calculation unit 74, and a series of processes ends.

Figure 15:
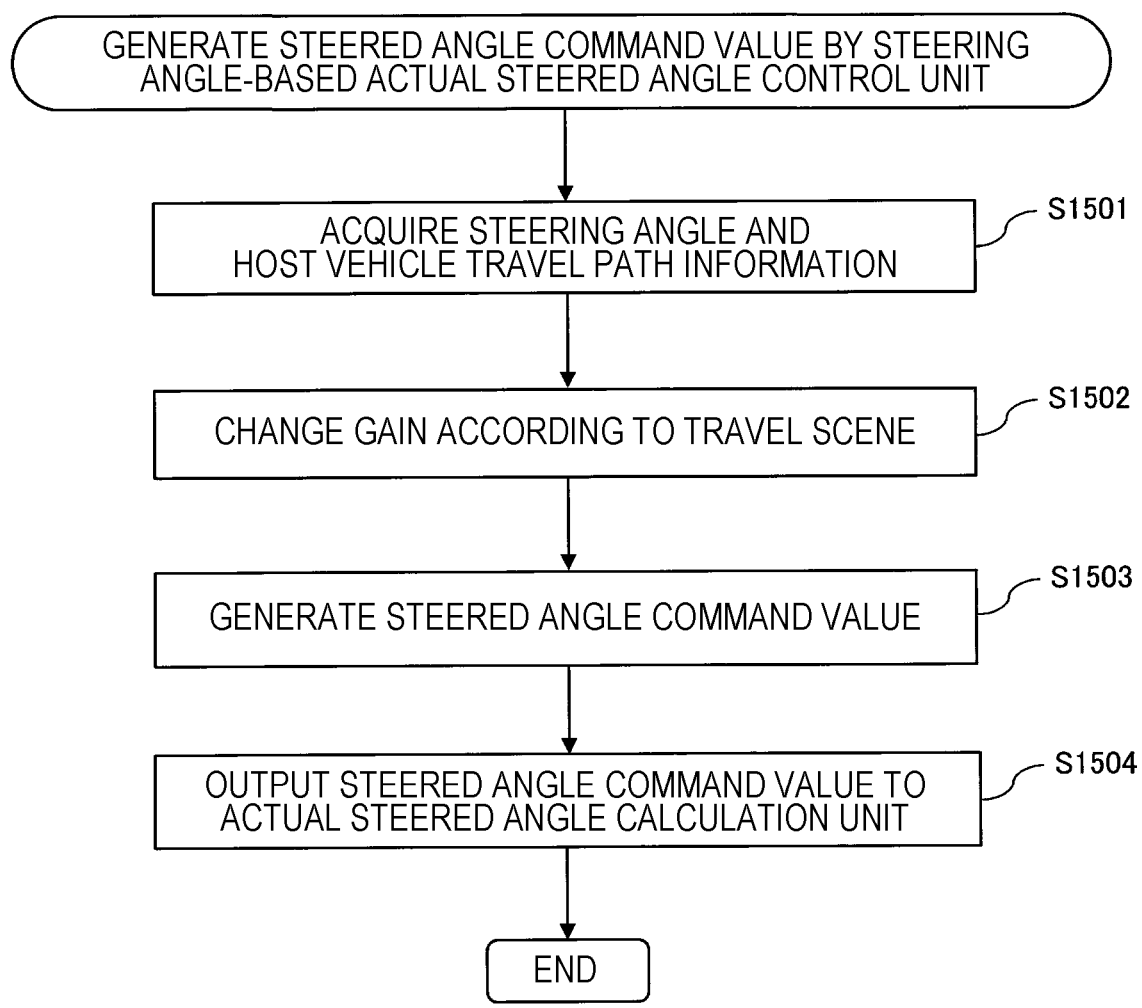
FIG. 15 is a flowchart for describing an operation in a steering angle-based actual steered angle control unit forming the steering control device illustrated in FIG. 12.

Next, a processing procedure of the steering angle-based actual steered angle control unit 73b will be described using a flowchart. FIG. 15 is a flowchart for describing an operation in the steering angle-based actual steered angle control unit 73b forming the steering control device 61b illustrated in FIG. 12.

As illustrated in FIG. 15, a steering angle and host vehicle travel path information are acquired in Step S1501, and the processing proceeds to Step S1502.

In Step S1502, the gain Kstr is increased or decreased according to a traveling scene from the host vehicle travel path information based on the information acquired in Step S1501, and the processing proceeds to Step S1503. In this gain setting, for example, steering with a large steering angle is required in a case where the traveling scene is the time of parking, and thus, the gain is increased such that a large actual steered angle can be generated with a small amount of steering wheel operation by the driver.

In Step S1503, the steering angle-based actual steered angle control unit 73b generates a steered angle command value from the steering torque and the gain Kstr using the information acquired in Steps S1501 and S1502, and the processing proceeds to Step S1504.

In Step S1504, the generated steered angle command value is output to the actual steered angle calculation unit 74, and a series of processes ends.

As described above, according to the present example, it is possible to adjust the gain according to course information for traveling and obstacle information, and to adjust a steering wheel operation amount of the driver according to the traveling scene, in addition to the effects of Example 1. For example, the driver can generate a large actual steered angle with a small steering angle at the time of parking, which requires steering with a large steering angle, and thus, the parking with a reduced steering amount becomes possible.

EXAMPLE 4

Figure 16:
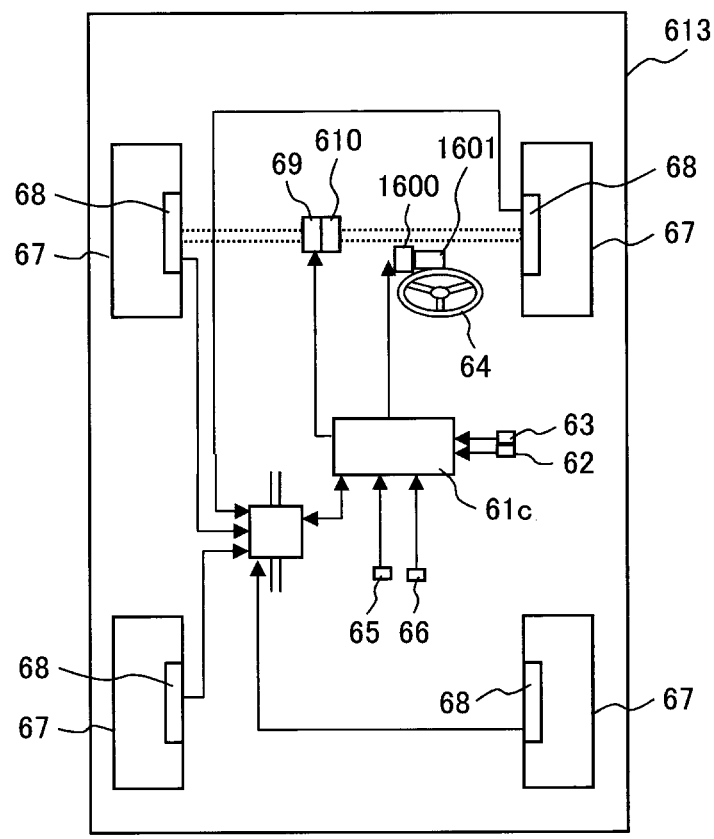
FIG. 16 is a conceptual diagram of a vehicle equipped with a steering control device of Example 4 according to still another example of the present invention.
Figure 17:
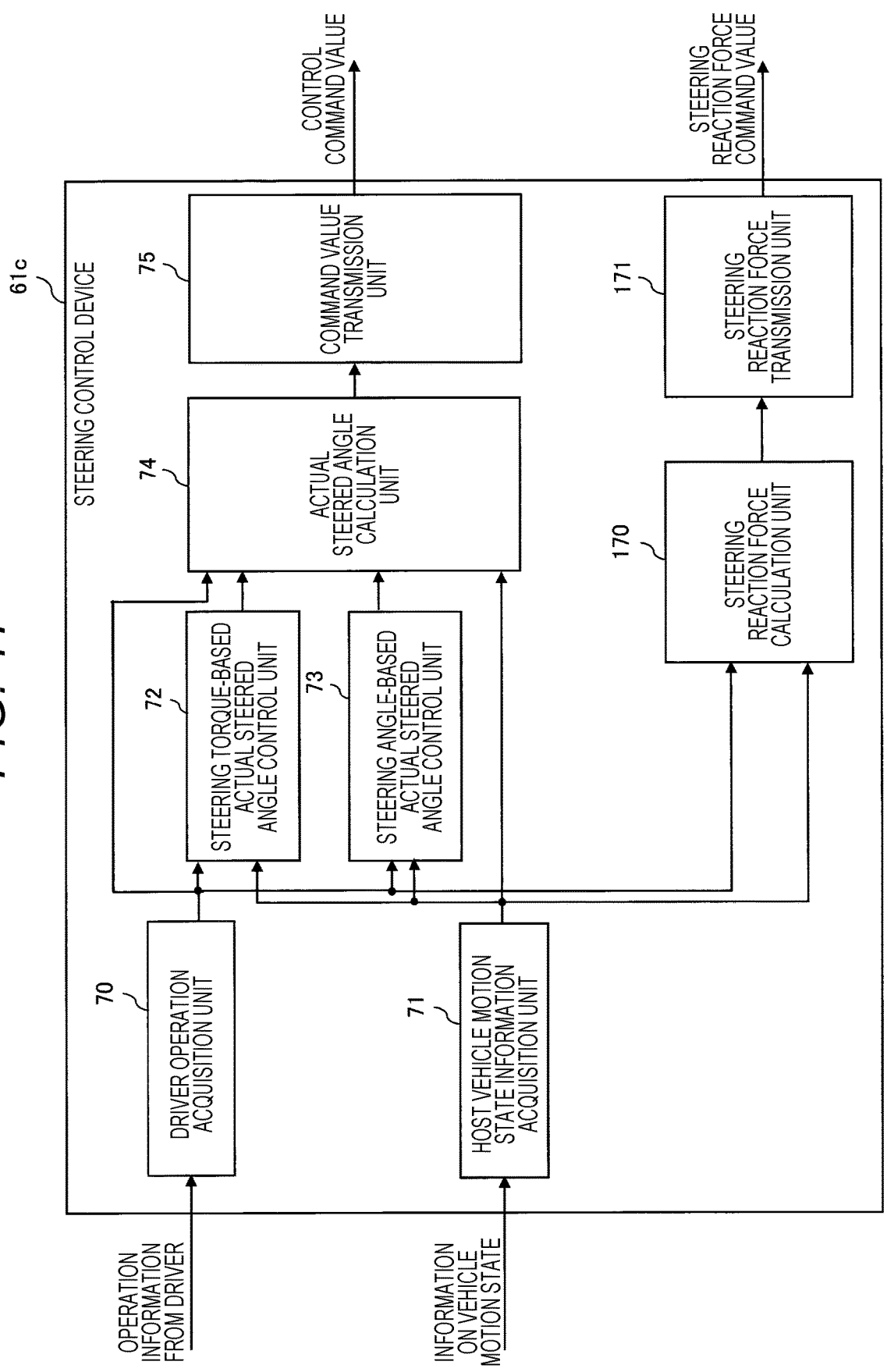
FIG. 17 is a functional block diagram of the steering control device illustrated in FIG. 16.

FIG. 16 is a conceptual diagram of a vehicle equipped with a steering control device 61c of Example 4 according to still another example of the present invention, and FIG. 17 is a functional block diagram of the steering control device 61c illustrated in FIG. 16. The present example is different from Example 1 in that the steering control device 61c further includes a steering reaction force calculation unit 170 and a steering reaction force transmission unit 171. The same components as those in Example 1 are denoted by the same reference signs, and redundant descriptions will be omitted below.

As illustrated in FIG. 16, the steering control device 61c according to the present example is mounted on the vehicle 613, performs calculation necessary for steering control based on each piece of information obtained from the acceleration sensor 62, the gyro sensor 63, and a wheel speed sensor 68, which acquire information on a vehicle motion state and the steering angle sensor 65 and the steering torque sensor 66 that acquire operation information from a driver, and transmits an actual steered angle command value to the actual steered angle control unit 69, which drives and controls the actual steered angle actuator 610, via a communication line based on a result of the calculation. In addition, a calculation necessary for steering reaction force control is performed based on each piece of the obtained information, and a steering reaction force command value is transmitted via the communication line to a steering reaction force control unit 1600 that drives and controls a steering reaction force actuator 1601 based on a result of the calculation. In addition, a signal transmitted from the steering control device 61c is preferably the steering reaction force command value (signal) that can realize the steering reaction force control by the steering reaction force actuator 1601, instead of a steering reaction force itself.

As illustrated in FIG. 17, the steering control device 61c further includes the steering reaction force calculation unit 170 and the steering reaction force transmission unit 171 as compared with the steering control device 61 according to Example 1 illustrated in FIG. 7.

The steering reaction force calculation unit 170 calculates a steering reaction force command value based on information obtained by the driver operation acquisition unit 70 and the host vehicle motion state information acquisition unit 71, and sends the steering reaction force command value to the steering reaction force transmission unit 171. As a calculation method, for example, the methods illustrated in FIGS. 4 and 5 described above are used.

Based on the steering reaction force command value generated by the steering reaction force calculation unit 170, the steering reaction force transmission unit 171 sends the steering reaction force command value to the steering reaction force control unit 1600 that drives and controls the steering reaction force actuator 1601 capable of controlling a reaction force of the steering wheel 64 in FIG. 16.

Figure 18:
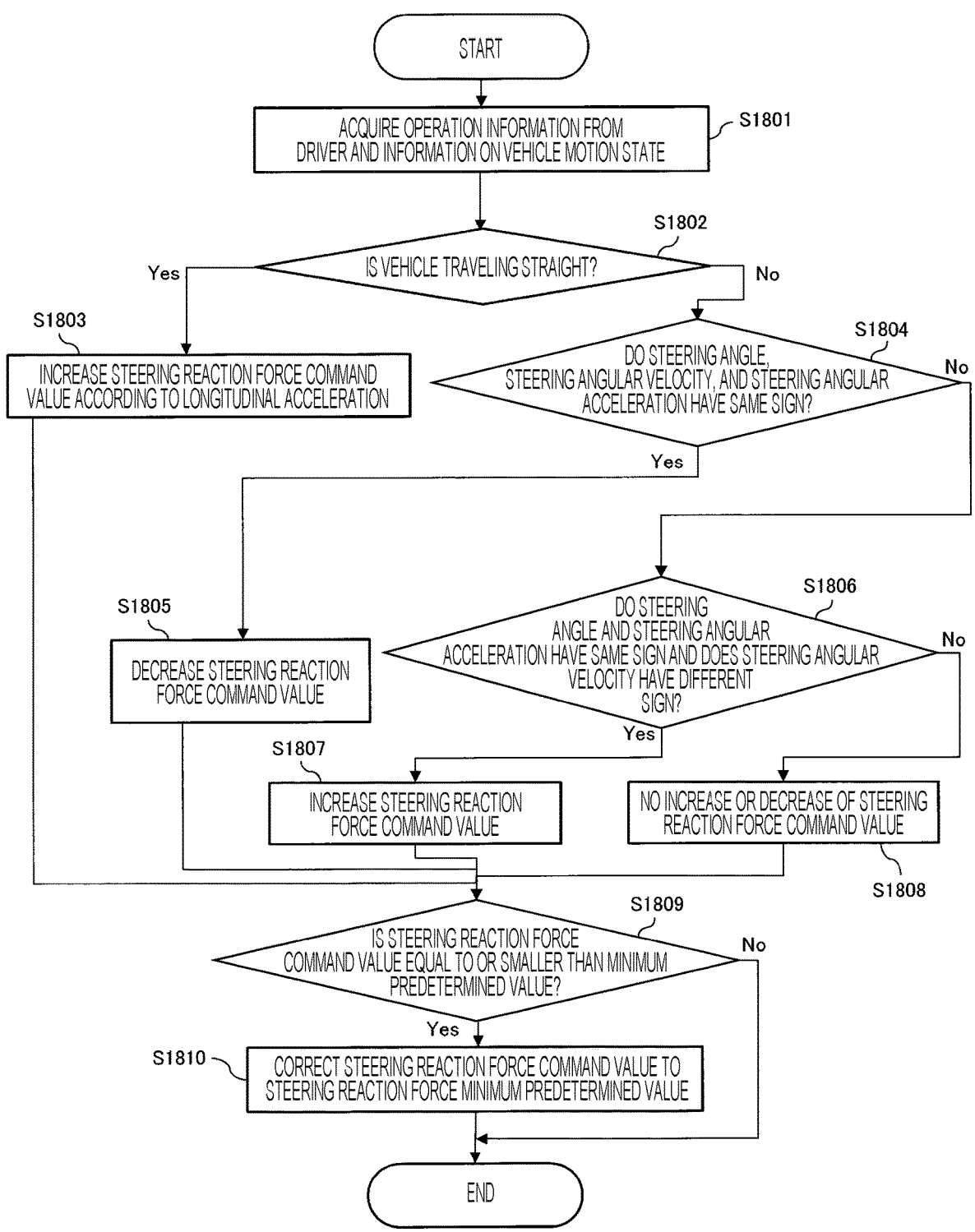
FIG. 18 is a flowchart for describing an operation in generation of a steering reaction force command value by the steering control device illustrated in FIG. 17.

Next, a processing procedure of the steering reaction force calculation unit 170 will be described with reference to a flowchart. FIG. 18 is a flowchart for describing an operation in generation of the steering reaction force command value by the steering control device 61c illustrated in FIG. 17.

As illustrated in FIG. 18, operation information from the driver and information on a vehicle motion state are acquired in Step S1801, and the processing proceeds to Step S1802.

In Step S1802, it is determined whether or not the vehicle is traveling straight based on the information acquired in Step S1801, and the processing proceeds to Step S1803 if it is determined that the vehicle is traveling straight, and the processing proceeds to Step S1804 if it is determined that the vehicle is not traveling straight.

In Step S1803, a steering reaction force command value is increased according to a longitudinal acceleration using the information acquired in Step S1801, and the processing proceeds to Step S1809.

Meanwhile, in Step S1804, it is determined whether or not a steering angle, a steering angular velocity, and a steering angular acceleration have the same sign based on the information acquired in Step S1801. The processing proceeds to Step S1805 if it is determined that these values have the same sign, and the processing proceeds to Step S1806 if it is determined that these values have different signs.

In Step S1805, the steering reaction force command value is decreased using the information acquired in Step S1801, and the processing proceeds to Step S1809.

Meanwhile, in Step S1806, it is determined whether or not the steering angle and the steering angular acceleration have the same sign and the steering angular velocity has a different sign based on the information acquired in Step S1801. The processing proceeds to Step S1807 if the steering angle and the steering angular acceleration have the same sign and the steering angular velocity has the different sign, and the processing proceeds to Step S1808 if not.

In Step S1807, the steering reaction force command value is increased using the information acquired in Step S1801, and the processing proceeds to Step S1809.

Meanwhile, the steering reaction force command value is maintained in Step S1808, and the processing proceeds to S1809.

When the steering reaction force command value acquired in Step S1803, Step S1805, Step S1807, or Step S1808 is smaller than a steering reaction force minimum predetermined value in Step S1809, the processing proceeds to Step S1810. When the steering reaction force command value exceeds the steering reaction force minimum predetermined value, the acquired steering reaction force command value is output to the steering reaction force transmission unit 171, and a series of processes ends. Note that it is assumed that the steering reaction force minimum predetermined value changes according to a vehicle speed.

In Step S1810, regarding the steering reaction force command value acquired in Step S1809, the steering reaction force command value is corrected to the steering reaction force minimum predetermined value and output to the steering reaction force transmission unit 171, and the series of processes ends.

As described above, according to the present example, the steering wheel provides a strong response to the driver's hand since the steering reaction force command value increases when the driver moves the vehicle straight by controlling the steering reaction force of the steering wheel, in addition to the effects of Example 1. As a result, the driver can obtain stability when traveling straight.

In addition, the steering reaction force command value decreases according to the steering angle when the driver causes the vehicle to perform cornering, and thus, the steering wheel reduces the response to the driver's hand. Therefore, the driver can secure the conventional operability of turning the steering wheel for cornering.

EXAMPLE 5

Figure 19:
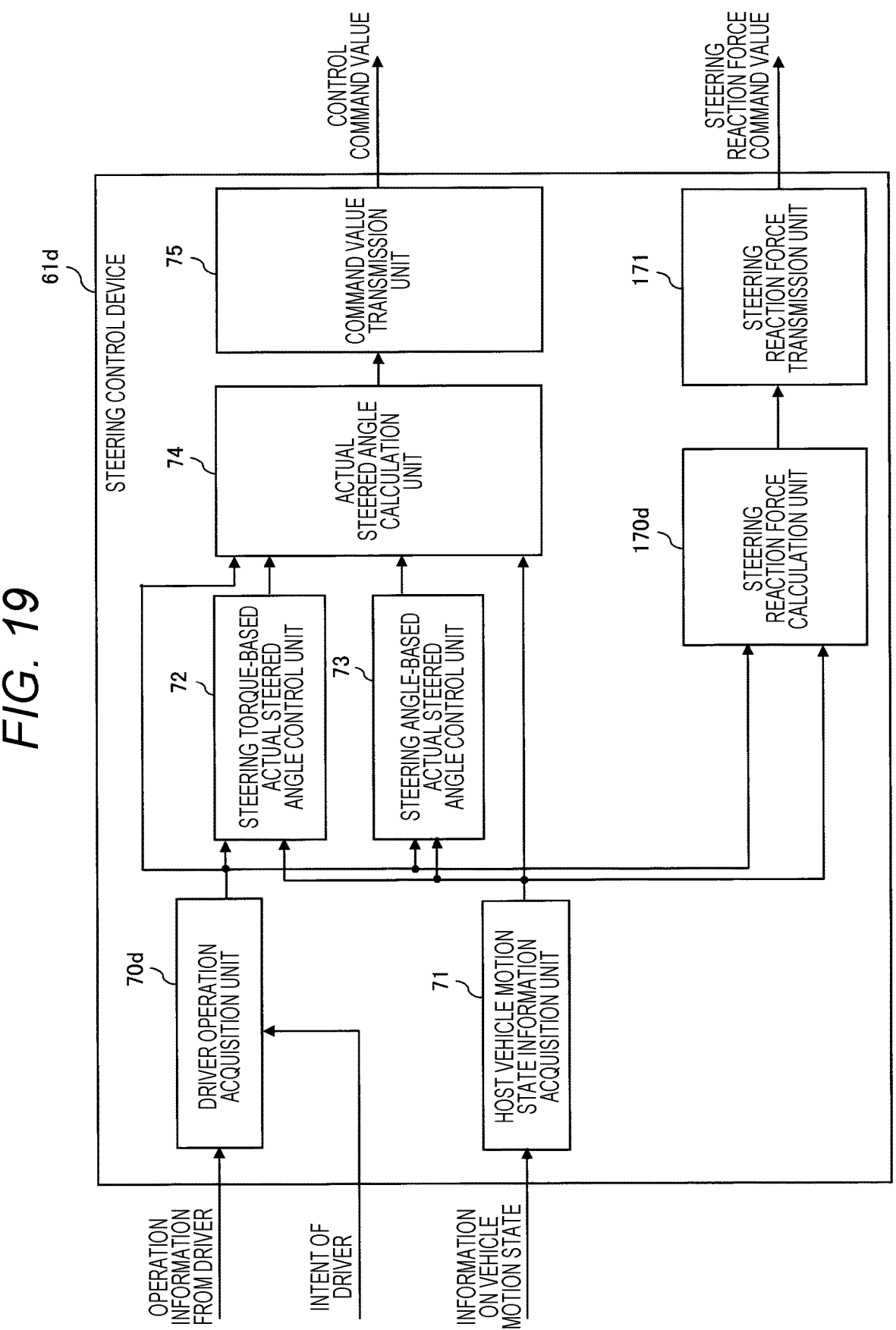
FIG. 19 is a functional block diagram of a steering control device of Example 5 according to still another example of the present invention.

FIG. 19 is a functional block diagram of a steering control device 61d of Example 5 according to still another example of the present invention. The present example is different from Example 1 in that a driver operation acquisition unit 70d further inputs an intention or the like of a driver in addition to operation information from the driver, and that a steering reaction force calculation unit 170d and the steering reaction force transmission unit 171 are provided. The same components as those in Example 1 are denoted by the same reference signs, and redundant descriptions will be omitted below.

As illustrated in FIG. 19, the driver operation acquisition unit 70d acquires the operation information (a steering angle operation amount, a steering torque input amount, a driver's intention, and the like) from the driver. Here, a parameter reflecting the driver's intention included in the operation information from the driver may be set by an input from the driver through a user interface, may be set by automatic learning and automatic tuning from driving by the driver, or may be set using a method of reflecting a value set in advance for each driver by driver authentication.

The steering reaction force calculation unit 170d calculates a steering reaction force command value based on information obtained by the driver operation acquisition unit 70d and the host vehicle motion state information acquisition unit 71, and sends the steering reaction force command value to the steering reaction force transmission unit 171. As a calculation method, for example, the methods illustrated in FIGS. 4 and 5 described above are used. In addition, the steering reaction force command value during straight traveling and/or the amount of change in the steering reaction force command value according to a change of a steering angle during cornering increases or decreases depending on the parameter reflecting the driver's intention by the driver operation acquisition unit 70d. For example, when there are two modes of a normal mode and a sport mode as the driver's intention, the steering reaction force command value may be set to be larger in the sport mode than in the normal mode. In addition, a method of changing these values based on a driving behavior of the driver may be adopted. For example, in a case where a steering angle change is performed more frequently than a reference steering model in a driver's operation at the time of turning on a single curved road, the amount of change of the steering reaction force command value according to the steering angle change may be changed such that the steering reaction force command value decreases.

As described above, according to the present example, a steering reaction force of a steering wheel is controlled to reflect the driver's intention in generation of a reaction force accompanying a steering wheel operation, so that the operability of the steering wheel and the steering responsiveness can be adjusted to settings suitable for the driver's intention, in addition to the effects of Example 1.

EXAMPLE 6

Figure 20:
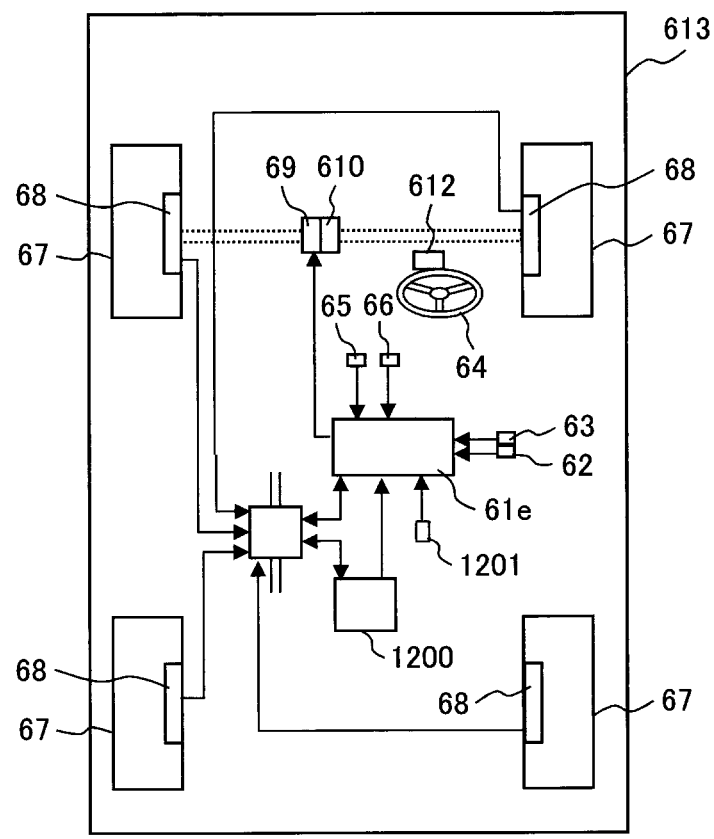
FIG. 20 is a conceptual diagram of a vehicle equipped with a steering control device of Example 6 according to still another example of the present invention.
Figure 21:
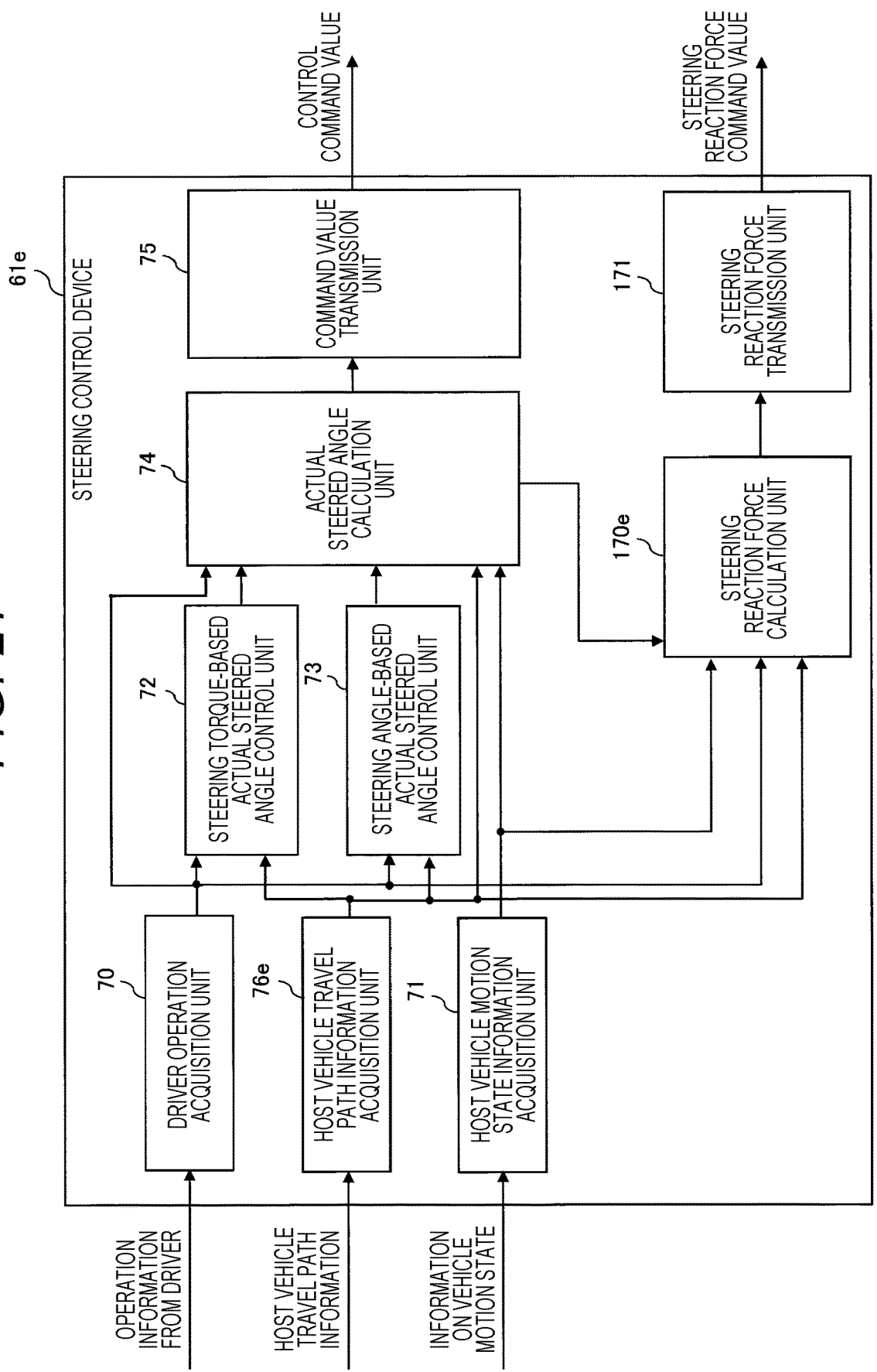
FIG. 21 is a functional block diagram of the steering control device illustrated in FIG. 20.

FIG. 20 is a conceptual diagram of a vehicle equipped with a steering control device 61e of Example 6 according to still another example of the present invention, and FIG. 21 is a functional block diagram of the steering control device 61e illustrated in FIG. 20. The present example is different from Example 1 in that the steering control device 61e includes a host vehicle travel path information acquisition unit 76e, a steering reaction force calculation unit 170e, and the steering reaction force transmission unit 171. The same components as those in Example 1 are denoted by the same reference signs, and redundant descriptions will be omitted below.

As illustrated in FIG. 20, the steering control device 61e according to the present example is mounted on the vehicle 613, performs calculation necessary for steering control based on each piece of information obtained from the acceleration sensor 62, the gyro sensor 63, and the wheel speed sensor 68, which acquire information on a vehicle motion state and the steering angle sensor 65 and the steering torque sensor 66 that acquire operation information from a driver and a host vehicle position detection sensor 1200 and an external environment information detection sensor 1201, which acquire host vehicle travel information, performs calculation necessary for steering control, and transmits an actual steered angle command value to the actual steered angle control unit 69, which drives and controls the actual steered angle actuator 610, via a communication line based on a result of the calculation. In addition, a calculation necessary for steering reaction force control is performed based on each piece of the obtained information, and a steering reaction force command value is transmitted via the communication line to a steering reaction force control unit 1600 that drives and controls a steering reaction force actuator 1601 based on a result of the calculation. In addition, a signal transmitted from the steering control device 61e is not a steering reaction force itself, but the steering reaction force is generated by the simulated steering reaction force generation device 612 having a spring mass damper system with respect to a change of a steering angle.

As illustrated in FIG. 21, the host vehicle travel path information acquisition unit 76e forming the steering control device 61e acquires host vehicle travel path information (host vehicle peripheral information, a travelable region, and the like).

The steering reaction force calculation unit 170e calculates a steering reaction force command value based on information obtained by the driver operation acquisition unit 70, the host vehicle motion state information acquisition unit 71, the actual steered angle calculation unit 74, and the host vehicle travel path information acquisition unit 76e, and sends the steering reaction force command value to the steering reaction force transmission unit 171. As a calculation method, for example, the methods illustrated in FIGS. 4 and 5 described above are used. In addition, a steering reaction force command value simulating a stroke end is calculated when it is determined that the vehicle is parked based on the host vehicle peripheral information and the travelable region of the host vehicle travel path information acquisition unit 76e and an actual steered angle of the actual steered angle calculation unit 74 is larger than a predetermined value.

Figure 22:
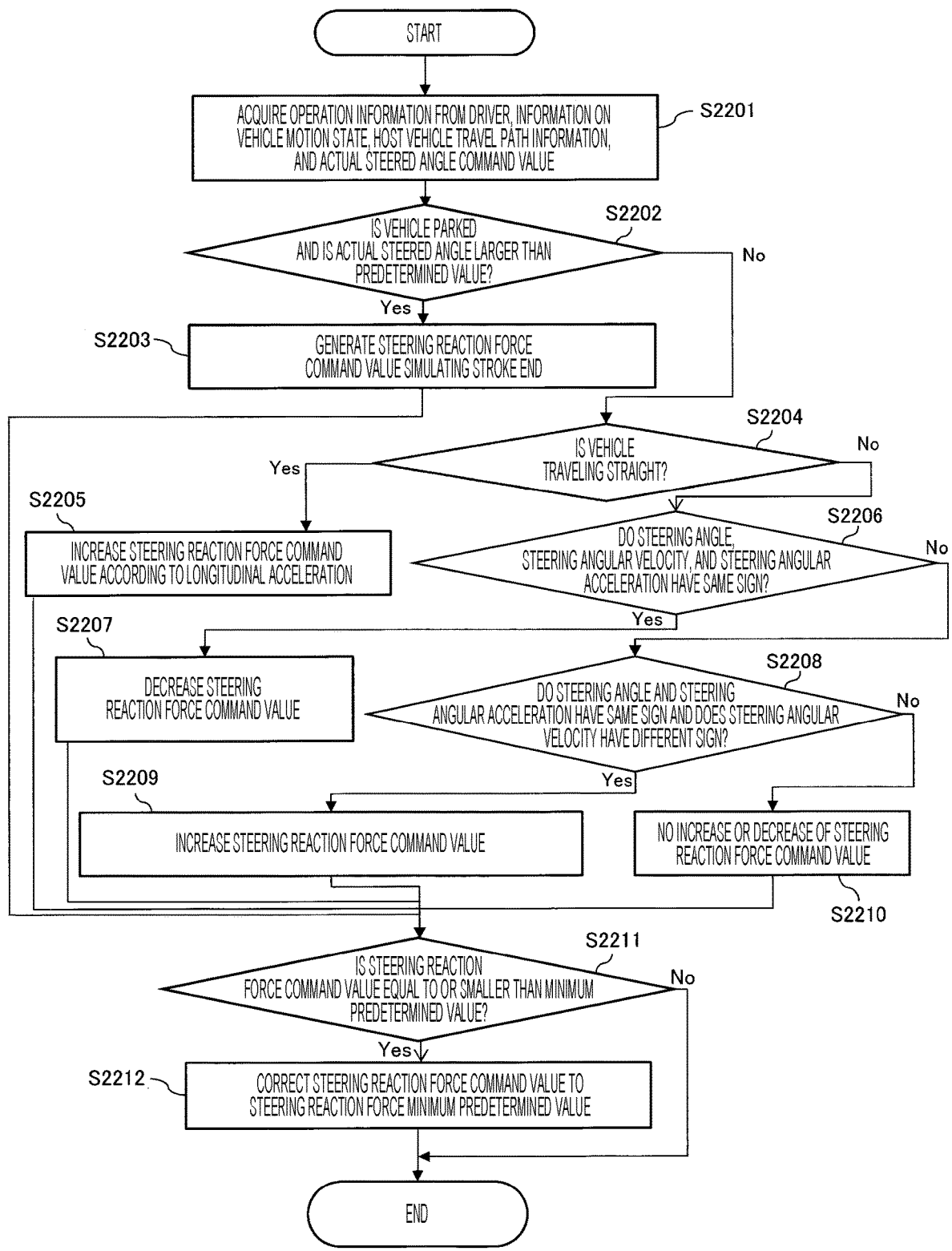
FIG. 22 is a flowchart for describing an operation in generation of a steering reaction force command value of the steering control device illustrated in FIG. 21.

Next, a processing procedure of the steering reaction force calculation unit 170e will be described using a flowchart. FIG. 22 is a flowchart for describing an operation in generation of the steering reaction force command value of the steering control device 61e illustrated in FIG. 21.

As illustrated in FIG. 22, operation information from the driver and information of a vehicle motion state are acquired in Step S2201, and the processing proceeds to Step S2202.

In Step S2202, it is determined whether the vehicle is parked and an actual steered angle command value is larger than a predetermined value based on the information acquired in Step S2201. The processing proceeds to Step S2203 if it is determined that the vehicle is parked and the actual steered angle command value is larger than the predetermined value, and the processing proceeds to Step S2204 if not.

In Step S2203, a steering reaction force command value simulating a stroke end is generated, and the processing proceeds to Step S2211.

In Step S2204, it is determined whether or not the vehicle is traveling straight based on the information acquired in Step S2201. The processing proceeds to Step S2205 if it is determined that the vehicle is traveling straight, and the processing proceeds to Step S2206 if it is determined that the vehicle is not traveling straight.

In Step S2205, the steering reaction force command value is increased according to a longitudinal acceleration using the information acquired in Step S2201, and the processing proceeds to Step S2211.

Meanwhile, in Step S2206, it is determined whether or not a steering angle, a steering angular velocity, and a steering angular acceleration have the same sign based on the information acquired in Step S2201. The processing proceeds to Step S2207 if it is determined that these values have the same sign, and the processing proceeds to Step S2208 if it is determined that these values have different signs.

In Step S2207, the steering reaction force command value is decreased using the information acquired in Step S2201, and the processing proceeds to Step S2211.

Meanwhile, in Step S2208, it is determined whether or not the steering angle and the steering angular acceleration have the same sign and the steering angular velocity has a different sign based on the information acquired in Step S2201. The processing proceeds to Step S2209 if the steering angle and the steering angular acceleration have the same sign and the steering angular velocity has the different sign, and the processing proceeds to Step S2210 if not.

In Step S2209, the steering reaction force command value is increased using the information acquired in Step S2201, and the processing proceeds to Step S2211.

Meanwhile, the steering reaction force command value is maintained in Step S2210, and the processing proceeds to Step S2211. When the steering reaction force command value acquired in Step S2203, Step S2205, Step S2207, Step S2209, or Step S2210 is smaller than a steering reaction force minimum predetermined value in Step S2211, the processing proceeds to Step S2212. When the steering reaction force command value exceeds the steering reaction force minimum predetermined value, the acquired steering reaction force command value is output to the steering reaction force transmission unit 171, and a series of processes ends. Note that it is assumed that the steering reaction force minimum predetermined value changes according to a vehicle speed.

In Step S2212, regarding the steering reaction force command value acquired in Step S2211, the steering reaction force command value is corrected to the steering reaction force minimum predetermined value and output to the steering reaction force transmission unit 171, and the series of processes ends.

As described above, according to the present example, the driver can recognize that the current actual steered angle has reached the stroke end by controlling a steering reaction force of a steering wheel, in addition to the effects of Example 1.

Note that the present invention is not limited to the above-described examples, but includes various modifications. For example, the above-described examples have been described in detail in order to describe the present invention in an easily understandable manner, and are not necessarily limited to one including the entire configuration that has been described above. In addition, a part of the configuration of a certain example can be replaced with the configuration of another example, and the configuration of another example can be added to the configuration of a certain example.

In addition, while the citation of other claims in the dependent claims is a single-claim citation for the sake of clarity of the description of the dependent claims, the present invention includes a form in which a plurality of claims are cited and a form in which a plurality of claims citing multi-claims are cited in the dependent claims.

REFERENCE SIGNS LIST 61, 61a, 61b, 61c, 61d, 61e steering control device
62 acceleration sensor
63 gyro sensor
64 steering wheel
65 steering angle sensor
66 steering torque sensor
67 tire
68 wheel speed sensor
69 actual steered angle control unit
70, 70a, 70d driver operation acquisition unit
71 host vehicle motion state information acquisition unit
72, 72b steering torque-based actual steered angle control unit
73, 73b steering angle-based actual steered angle control unit
74, 74a actual steered angle calculation unit
75 command value transmission unit
76, 76e host vehicle travel path information acquisition unit
170, 170d, 170e steering reaction force calculation unit
171 steering reaction force transmission unit
610 actual steered angle actuator
612 simulated steering reaction force generation device
613 vehicle
1200 host vehicle position detection sensor
1201 external environment information detection sensor
1600 steering reaction force control unit
1601 steering reaction force actuator

The invention claimed is:

1. A steering control device forming a steer-by-wire system, wherein a steering angle and a steering torque generated by a driver on a steering shaft connected to a steering wheel of a vehicle has no direct mechanical connection to a steered angle of a tire of the vehicle, the steering control device comprising:
a steering reaction force calculation unit that controls a reaction force according to a state of the vehicle and/or the steering angle, wherein a minimum value of the reaction force does not become equal to or smaller than a predetermined value; and
a calculation unit that determines the steered angle of the tire based on the steering angle and the steering torque generated on the steering shaft, wherein the calculation unit performs control such that:
(i) in an initial stage of steering, in which the steering angle is equal to or less than a predetermined value, the steered angle is controlled based on the steering torque, and
(ii) the steered angle is controlled based on (a) a parameter different from the steering torque when the steering angle is larger than the predetermined value or (b) a changed steering torque gain from when the steering angle is smaller than the predetermined value.

2. The steering control device according to claim 1, wherein
the parameter different from the steering torque is the steering angle.

3. The steering control device according to claim 1, wherein
the calculation unit controls the steering torque when the steering angle is smaller than the predetermined value, and controls the steered angle when the steering angle is equal to or larger than the predetermined value.

4. The steering control device according to claim 3, wherein
the predetermined value is changed according to a state of the vehicle or an intention of the driver.

5. The steering control device according to claim 3, wherein
the calculation unit controls the steered angle to return to zero when the steering torque returns to zero.

6. The steering control device according to claim 3, wherein
the calculation unit performs control such that a yaw rate returns to zero when the steering torque returns to zero.

7. The steering control device according to claim 3, wherein
the calculation unit performs control such that a yaw rate becomes constant when the steering torque or the steering angle is constant.

8. The steering control device according to claim 3, wherein
the calculation unit performs control such that a lateral acceleration becomes constant when the steering torque or the steering angle is constant.

9. The steering control device according to claim 3, wherein
the calculation unit changes both control of the steering torque and control of the steered angle to a high gain when determining that the vehicle is parking.

10. The steering control device according to claim 9, wherein
the calculation unit performs steering reaction force control for simulating a stroke end.

11. The steering control device according to claim 1, further comprising
a steering reaction force calculation unit that controls a steering reaction force according to a state of the vehicle,
wherein the steering reaction force calculation unit controls a reaction force based on a longitudinal acceleration.

12. The steering control device according to claim 11, wherein
the steering reaction force calculation unit controls the reaction force only when the vehicle travels straight.

13. The steering control device according to claim 1, wherein
a minimum predetermined value of the reaction force changes according to a vehicle speed.

14. The steering control device according to claim 1, further comprising
a steering reaction force calculation unit that controls a reaction force according to a state of the vehicle and/or the steering angle,
wherein the steering reaction force calculation unit decreases the reaction force only when the steering angle, a steering angular velocity, and a steering angular acceleration have an identical sign.

15. The steering control device according to claim 1, further comprising
a steering reaction force calculation unit that controls a reaction force according to a state of the vehicle and/or the steering angle,
wherein the steering reaction force calculation unit increases the reaction force when the steering angle and a steering angular acceleration have an identical sign but a steering angular velocity has a different sign.

16. A steering control device forming a steer-by-wire system, wherein a steering angle and a steering torque generated by a driver on a steering shaft connected to a steering wheel of a vehicle has no direct mechanical connection to a steered angle of a tire of the vehicle, the steering control device comprising:
a steering reaction force calculation unit that controls a steering reaction force according to a state of the vehicle, wherein the steering reaction force calculation unit controls a reaction force:
(i) based on a longitudinal direction, and
(ii) only when the vehicle travels straight; and
a calculation unit that determines the steered angle of the tire based on the steering angle and the steering torque generated on the steering shaft, wherein the calculation unit controls:
(i) the steered angle based on the steering torque in a region where the steering angle is equal to or smaller than a predetermined value,
(ii) the steered angle based on (a) a parameter different from the steering torque when the steering angle is larger than the predetermined value or (b) a changed steering torque gain from when the steering angle is smaller than the predetermined value,
(iii) the steering torque when the steering angle is smaller than the predetermined value, and
(iv) the steered angle when the steering angle is equal to or larger than the predetermined value,
wherein the predetermined value is changed according to a state of the vehicle or an intention of the driver.

17. A steering control device forming a steer-by-wire system, wherein a steering angle and a steering torque generated by a driver on a steering shaft connected to a steering wheel of a vehicle has no direct mechanical connection to a steered angle of a tire of the vehicle, the steering control device comprising:
a steering reaction force calculation unit that controls a reaction force according to a state of the vehicle and/or the steering angle, wherein the steering reaction force calculation unit decreases the reaction force only when the steering angle, a steering angular velocity, and a steering angular acceleration have an identical sign; and
a calculation unit that determines the steered angle of the tire based on the steering angle and the steering torque generated on the steering shaft, wherein the calculation unit controls:
(i) the steered angle based on the steering torque in a region where the steering angle is equal to or smaller than a predetermined value, and
(ii) the steered angle based on (a) a parameter different from the steering torque when the steering angle is larger than the predetermined value or (b) a changed steering torque gain from when the steering angle is smaller than the predetermined value,
wherein the predetermined value is changed according to a state of the vehicle or an intention of the driver.

* * * * *